United States Patent
Kurosawa et al.

(10) Patent No.: US 9,503,011 B2
(45) Date of Patent: Nov. 22, 2016

(54) MOTOR DRIVING METHOD, MOTOR DRIVING DEVICE, AND HARD DISK DEVICE

(71) Applicant: Renesas Electronics Corporation, Tokyo (JP)

(72) Inventors: Minoru Kurosawa, Tokyo (JP); Kichiya Itagaki, Tokyo (JP); Seigi Ishiji, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/946,671

(22) Filed: Nov. 19, 2015

(65) Prior Publication Data

US 2016/0241177 A1  Aug. 18, 2016

(30) Foreign Application Priority Data

Feb. 16, 2015  (JP) ................. 2015-027114

(51) Int. Cl.
*H02P 1/30* (2006.01)
*H02P 23/00* (2016.01)
*H02P 29/00* (2016.01)

(52) U.S. Cl.
CPC ......... *H02P 23/0077* (2013.01); *H02P 29/00* (2013.01)

(58) Field of Classification Search
CPC ...... B62D 6/045; H02P 27/08; H02M 3/157; H03F 3/217; H03K 7/08
See application file for complete search history.

(56) References Cited

U.S. PATENT DOCUMENTS

| | | | |
|---|---|---|---|
| 5,764,024 A * | 6/1998 | Wilson | H02M 7/53873 318/400.11 |
| 7,088,063 B2 | 8/2006 | Kurosawa et al. | |
| 2009/0196072 A1* | 8/2009 | Ye | H02M 7/493 363/17 |
| 2012/0091935 A1* | 4/2012 | Bucella | H02P 25/02 318/400.27 |
| 2015/0001940 A1* | 1/2015 | Berton | H02M 7/53806 307/52 |
| 2015/0028840 A1* | 1/2015 | Pasqualetto | H02P 7/29 323/311 |

FOREIGN PATENT DOCUMENTS

JP  2005-102447 A  4/2005

\* cited by examiner

*Primary Examiner* — Shawki S Ismail
*Assistant Examiner* — Zoheb Imtiaz
(74) *Attorney, Agent, or Firm* — McGinn IP Law Group, PLLC

(57) ABSTRACT

The present invention is intended to reduce noise and vibration of a motor. A first duty correction circuit generates a first corrected duty instruction value which changes with an increment same as an increment of a duty instruction value and in which an offset value as a constant is reflected. A second duty correction circuit generates a second corrected duty instruction value which changes with an increment different from an increment of the duty instruction value. A selector outputs, as the corrected duty instruction value, either one of the first corrected duty instruction value and the second corrected duty instruction value in accordance with a magnitude relation between the duty instruction value and a duty reference value.

20 Claims, 19 Drawing Sheets

MOTOR DRIVING METHOD, MOTOR DRIVING DEVICE, AND HARD DISK DEVICE

CROSS-REFERENCE TO RELATED APPLICATIONS

The disclosure of Japanese Patent Application No. 2015-027114 filed on Feb. 16, 2015 including the specification, drawings and abstract is incorporated herein by reference in its entirety.

BACKGROUND

The present invention relates to a motor driving method, a motor driving device, and a hard disk device and relates to, for example, a method of driving a spindle motor which rotates a magnetic disk.

For example, patent literature 1 discloses a method of generating a sinusoidal drive voltage by using a pattern in which a lower hook whose voltage minimum phase is set to GND and an upper hook whose voltage maximum phase is set to a power supply are alternately repeated every electric angle of 60 degrees.

RELATED ART LITERATURE

Patent Literature

Patent Literature 1: Japanese Unexamined Patent Application Publication No. 2005-102447

SUMMARY

In recent years, for example, as a method of driving a spindle motor of a hard disk (hereinbelow, called HDD) device, to realize reduction in noise and vibration, a method of reducing a torque ripple by passing sinusoidal current to a motor is employed. To pass sinusoidal current to a motor, sinusoidal voltage of high precision has to be applied to the motor. There are some methods for generating the sinusoidal voltage of high precision such as a method using a table.

In practice, the generated sinusoidal voltage is applied to a motor via a driver. Therefore, even when the sinusoidal voltage of high precision can be generated, precision of the sinusoidal voltage actually applied to the motor deteriorates due to an error which occurs in the driver. Concretely, for example, in the case of driving a motor on the basis of a PWM (Pulse Width Modulation), an error may occur between a duty instructed to a driver and a duty output from the driver.

Embodiments to be described later are made in consideration of the above and the other objects and novel features will become apparent from the description of the specification and the appended drawings.

A motor driving method according to an embodiment drives a motor by using a motor driving device having a drive transistor and a regenerative transistor. The drive transistor passes drive current to the motor when it is controlled to be on, and the regenerative transistor configures a half bridge circuit in cooperation with the drive transistor and, when controlled to be on, passes regenerating current from the motor. The motor driving device executes a duty instructing operation, a duty correcting operation, a PWM signal generating operation, and a drive operation. In the duty instructing operation, a duty instruction value expressing ratio of an on period in a PWM cycle is output. In the duty correcting operation, the duty instruction value is corrected, and as a corrected duty instruction value, either one of a first corrected duty instruction value and a second corrected duty instruction value is output in accordance with a magnitude relation between the duty instruction value and a duty reference value. In the PWM signal generating operation, a PWM signal based on the corrected duty instruction value is generated. In the drive operation, the drive transistor is controlled to be on in the on period in the PWM signal, the regenerative transistor is controlled to be on in an off period in the PWM signal, the regenerative transistor is controlled from on to off in response to transition from the off period in the PWM signal to the on period, and the drive transistor is controlled from off to on after off of the regenerative transistor is detected. The first corrected duty instruction value is a value which changes with an increment same as an increment of the duty instruction value and in which an offset value as a constant is reflected, and the second corrected duty instruction value is a value which changes with an increment different from an increment of the duty instruction value.

According to the embodiment, noise and vibration of a motor can be reduced.

BRIEF DESCRIPTION OF THE DRAWINGS

FIG. 12A illustrates characteristics in the case where duty correction is not performed, and FIG. 12B illustrates characteristics in the case where correction is performed by using the configuration of FIG. 11A.

DETAILED DESCRIPTION

Figure 1:
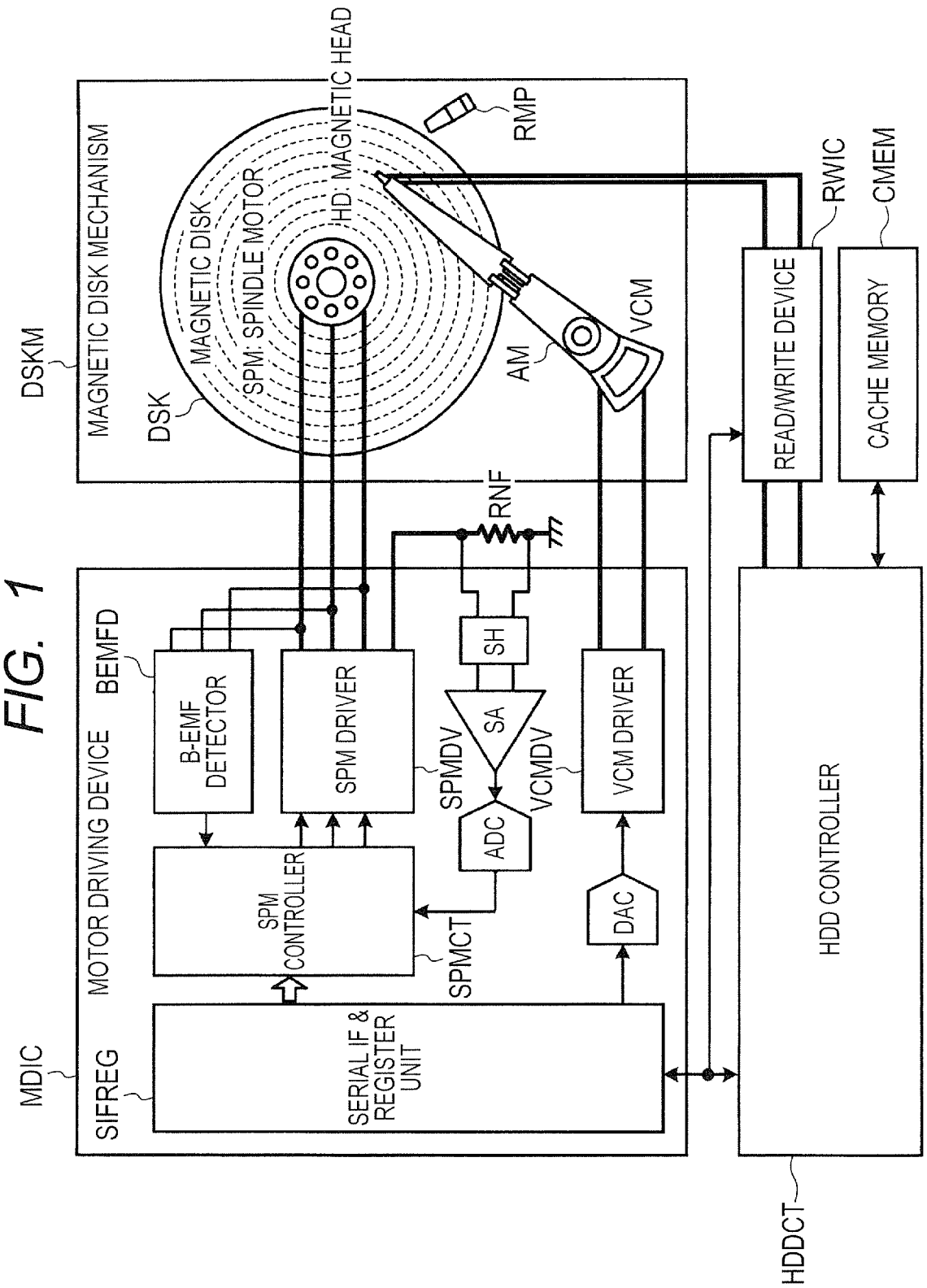
FIG. 1 is a functional block diagram illustrating a schematic configuration example of an HDD device according to a first embodiment of the present invention.

In the following embodiments, when necessary for convenience, the invention will be described by being divided into a plurality of sections or embodiments. Except for an explicitly specified case, they are not non-related to one another but have a relation such that one is a modification, details, or supplemental explanation of a part or all of the other. In the following embodiments, in the case of referring to the number of elements or the like (including the number of pieces, numerical value, quantity, and range), the invention is not limited to the specific number but may be equal to or larger or smaller than the specific number except for the explicitly specified case, the case where the invention is obviously limited to the specific number, and the like in principle.

Further, in the following embodiment, obviously, the components (including element steps and the like) are not always necessary except for the explicitly specified case, the case where the component is considered to be clearly necessary in principle, and the like. Similarly, in the following embodiments, in the case of referring to shape, positional relation, or the like of a component or the like, except for an explicitly specified case, the case where it is considered to be clearly different in principle, and the like, it is assumed that a component close or similar to the shape or the like is included. This is similarly applied to the numerical value and the range.

Circuit elements configuring each of functional blocks of the embodiments are, although not limited, formed on a semiconductor substrate of single-crystal silicon or the like by the integrated circuit technique of a known CMOS (Complementary MOS transistor) or the like.

Hereinbelow, embodiments of the present invention will be specifically described with reference to the drawings. In all of the drawings for describing the embodiments, as a general rule, the same reference numeral is designated to the same part and its repetitive description will not be given.

First Embodiment

Schematic Configuration and Schematic Operation of HDD Device

FIG. 1 is a functional block diagram illustrating a schematic configuration example of an HDD device according to a first embodiment of the present invention. An HDD device illustrated in FIG. 1 has an HDD controller HDDCT, a cache memory CMEM, a read/write device RWIC, a motor driving device MDIC, and a magnetic disk mechanism DSKM. The HDD controller HDDCT is configured by, for example, a system-on-chip (SoC) including a processor. The cache memory CMEM, the read/write device RWIC, and the motor driving device MDIC are configured by, for example, different semiconductor chips.

The magnetic disk mechanism DSKM has a magnetic disk DSK, a spindle motor SPM, a magnetic head HD, an arm mechanism AM, a voice coil motor VCM, and a ramp mechanism RMP. The spindle motor SPM rotates the magnetic disk DKS. The voice coil motor VCM controls the position of the magnetic head HD in the radial direction of the magnetic disk DSK via the arm mechanism AM. The magnetic head HD reads/writes data from/to the magnetic disk DSK in a predetermined position determined by the voice coil motor VCM. The ramp mechanism RMP is an evacuation place of the magnetic head HD in the case where data reading/writing is not executed.

The motor driving device MDIC has a digital/analog converter DAC and a VCM driver VCMDV to drive the voice coil motor VCM. The motor driving device MDIC also has an SPM controller SPMCT, a sample and hold circuit SH, a sense amplifier circuit SA, an analog/digital converter ADC, an SPM driver SPMDV, and a B-EMF detector BEMFD to drive the spindle motor SPM. Further, the motor driving device MDIC has a serial IF & register unit SIFREG to set driving conditions of the spindle motor SPM and the voice coil motor VCM and the like.

The read/write device RWIC drives the magnetic head HD and makes the magnetic head HD read/write data. The HDD controller HDDCT controls the entire HDD device. For example, by performing communication with the serial IF & register unit SIFREG, the HDD controller HDDCT gives an instruction of a driving condition and the like of the spindle motor SPM and the voice coil motor VCM to the motor driving device MDIC. The HDD controller HDDCT, for example, gives an instruction of reading/writing of data to the read/write device RWIC. At this time, write data instructed to the read/write device RWIC and read data from the magnetic head HD via the read/write device RWIC is held in the cache memory CMEM.

Next, the general operation of the HDD device will be briefly described. The motor driving device MDIC receives an instruction to activate the spindle motor SPM from the HDD controller HDDCT and drives the spindle motor SPM via the SPM driver SPMDV by using a PWM signal generated by the SPM controller SPMCT. A current detection resistor RNF detects drive current for the spindle motor SPM.

The drive current for the motor is converted to a digital value by the sample and hold circuit SH, the sense amplifier circuit SA, and the analog/digital converter ADC. On the basis of the detection value (digital value) of the drive current and a current instruction value as a target value of the drive current, the SPM controller SPMCT generates a PWM signal for reducing the error. The current instruction value is instructed by, for example, the HDD controller HDDCT.

The B-EMF detector BEMFD detects the rotation position of the spindle motor SPM by detecting back electromotive force (B-EMF) of the spindle motor SPM. The SPM controller SPMCT controls the spindle motor SPM (that is, the magnetic disk DSK) at rated speed by outputting the PWM signal for making the drive current of the motor close to the current instruction value to the SPM driver SPMDV at an appropriate timing according to the rotation position of the motor.

Figure 2:
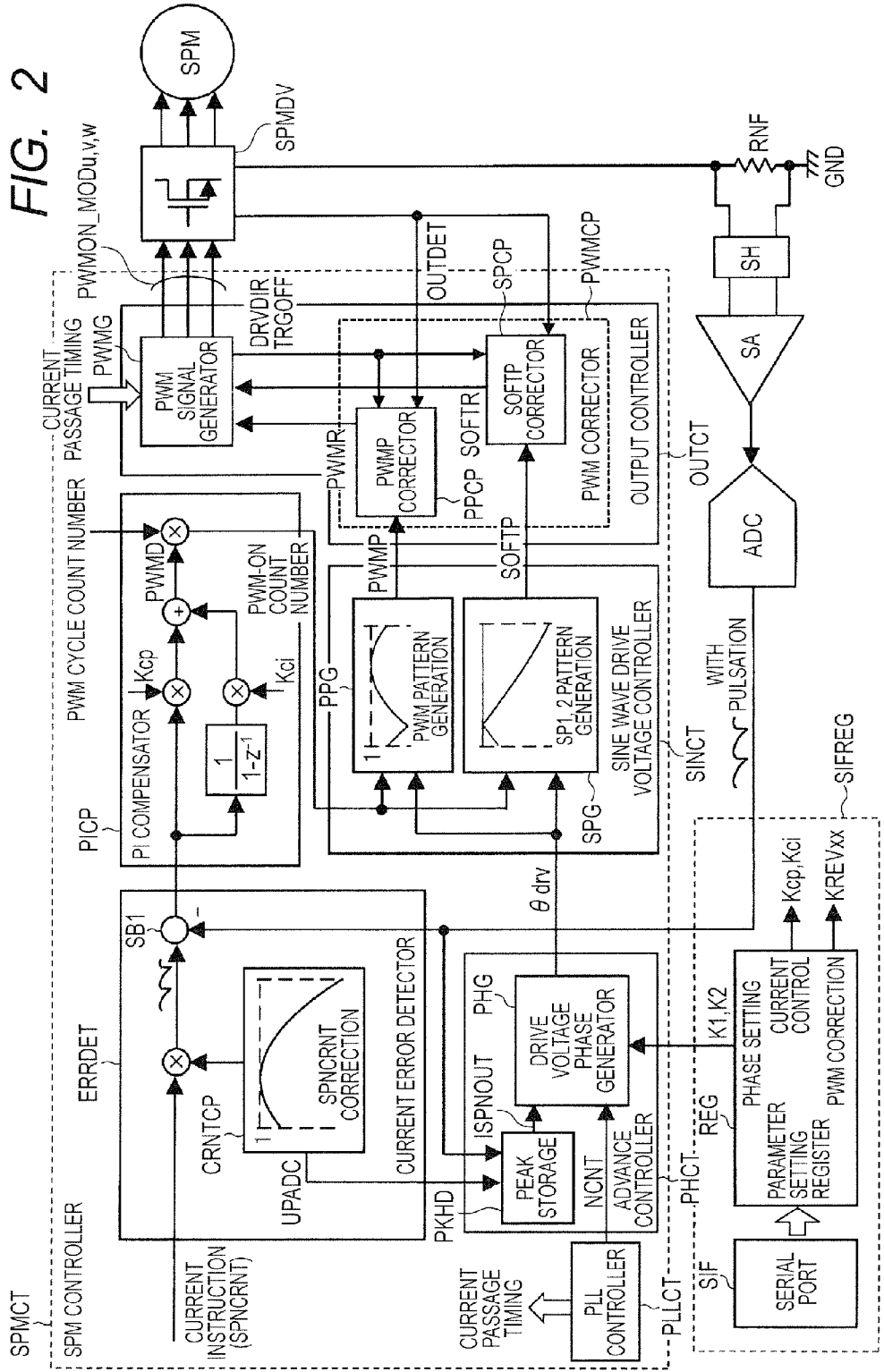
FIG. 2 is a functional block diagram illustrating a configuration example of a main part of a motor driving device in FIG. 1.

After the spindle motor SPM reaches the state of the rated-speed rotation, the VCM driver VCMDV moves the magnetic head HD onto the magnetic disk DSK, and the magnetic head HD reads/writes data from/to the magnetic disk DSK. To increase the positioning precision of the magnetic head HD, in addition to increase in the precision of the control by the VCM driver VCMDV, reduction in vibration of the spindle motor SPM is an important factor. It is beneficial to use the motor driving method according to the embodiment which will be descried later. Configuration and Operation of Main Part of Motor Driving Device FIG. 2 is a functional block diagram illustrating a configuration example of the main part of the motor driving device in FIG. 1. FIGS. 4 to 7 are explanatory diagrams illustrating the operation principle of the sine wave drive voltage controller SINCT in FIG. 2. In FIG. 2, in the motor driving device MDIC in FIG. 1, the SPM controller SPMCT, the SPM driver SPMDV, the serial IF & register unit SIFREG, the sample and hold circuit SH, the sense amplifier circuit SA, and the analog/digital converter ADC are illustrated. In addition, the current detection resistor RNF provided on the outside of the motor driving device MDIC and the spindle motor SPM in the magnetic disk mechanism DSKM are illustrated.

As described above, the current detection resistor RNF performs detection of the drive current of the spindle motor SPM and voltage conversion, and the sample and hold circuit SH holds the detected voltage at a predetermined timing. The sense amplifier circuit SA amplified the held detection voltage, and the analog/digital converter ADC converts the amplified voltage to a digital value. The SPM controller SPMCT has a PLL controller PLLCT, a current error detector ERRDET, an advance controller PHCT, a PI compensator PICP, a sine wave drive voltage controller SINCT, and an output controller OUTCT.

On the basis of a detection signal (concretely, a clock signal having a frequency according to rotation speed) of the B-EMF detector BEMFD illustrated in FIG. 1, the PLL controller PLLCT generates a timing signal which is synchronized with the detection signal. The PLL controller PLLCT controls the current passage timing of the output controller OUTCT on the basis of the timing signal and outputs a rotation cycle count value NCNT to the advance controller PHCT. The rotation cycle count value NCNT is a value obtained by counting time proportional to length of one cycle of the detection signal of the B-EMF detector BEMFD by the reference clock of digital control.

The current error detector ERRDET detects an error between the current instruction value SPNCRNT and a digital value (that is, a detection value of drive current of the motor) output from the analog/digital converter ADC by using a subtracter (error detector) SB1. As described above, the current instruction value SPNCRNT is instructed, for example, from the HDD controller HDDCT in FIG. 1. For example, the HDD controller HDDCT receives a detection result (not illustrated) of the rotation speed of the motor and generates the current instruction value SPNCRNT for setting the rotation speed to target rotation speed by predetermined arithmetic operation.

The PI compensator PICP performs proportional (P) integral (I) control using the error value detected by the current error detector ERRDET as an input to calculate a PWM duty value PWMD in which the current error is reflected. The PI compensator PICP multiplies the PWM duty value PWMD with a predetermined PWM cycle count value to calculate a PWM on count value. The PWM cycle count is a value obtained by converting length of one cycle of a PWM signal to a count value of the reference clock of digital control, and the PWM on count value is a value obtained by converting the on period in one cycle of the PWM signal to the count value.

The sine wave drive voltage controller (duty instructor) SINCT receives the PWM on count value from the PI compensator PICP and generates a duty instruction value for each PWM cycle which is required to apply a sine wave voltage of three phases (u phase, v phase, and w phase) to the spindle motor SPM. The duty instruction value expresses the ratio of the on period in the PWM cycle. Concretely, the sine wave drive voltage controller SINCT concretely has a PWM pattern generator PPG generating the duty instruction value PWMP for a PWM pattern and a soft pattern generator SPG generating a duty instruction value SOFTP for soft patterns (SP1 and SP2).

Figure 4:
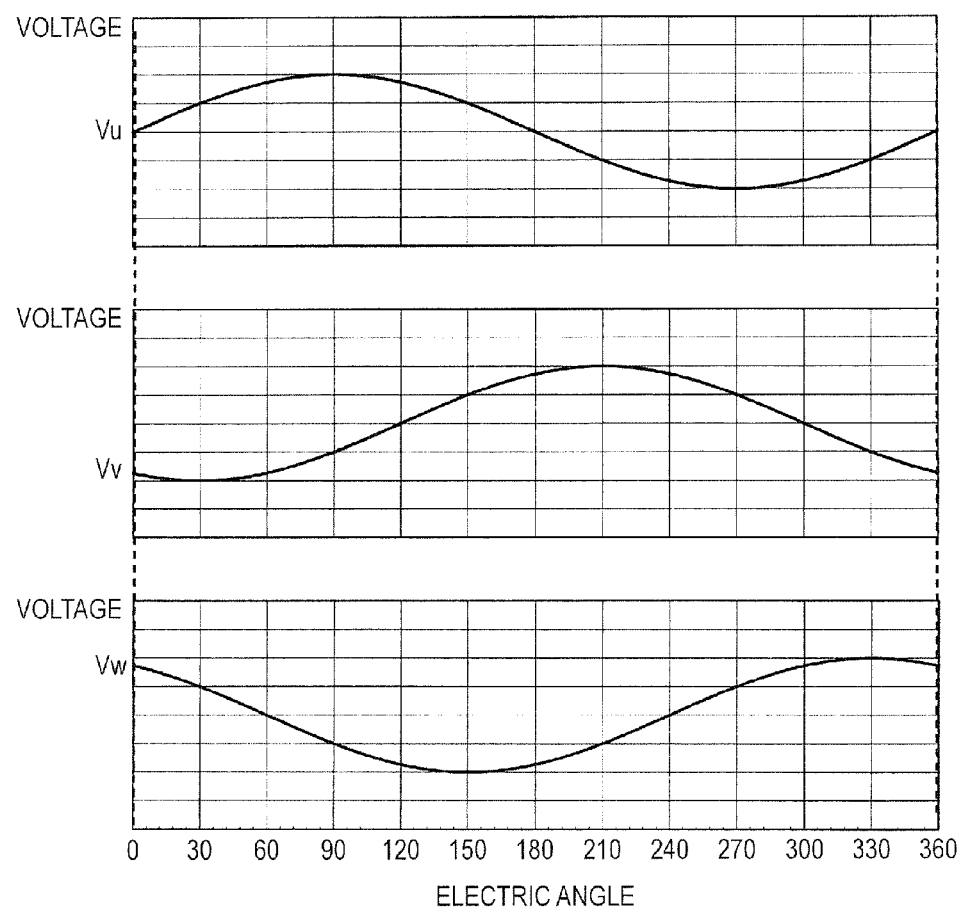
FIG. 4 is an explanatory diagram illustrating the operating principle of a sine wave drive voltage controller in FIG. 2.

The PWM pattern generator PPG and the soft pattern generator SPG generate a duty instruction value by a principle as illustrated in FIGS. 4 to 7. FIG. 4 illustrates ideal sinusoidal voltages Vu, Vv, and Vw of three phases applied to the spindle motor SPM in the case of applying a so-called sine wave driving method (that is, a method of controlling drive current of a motor to a sine wave shape) as a driving method for the spindle motor SPM.

Figure 5:
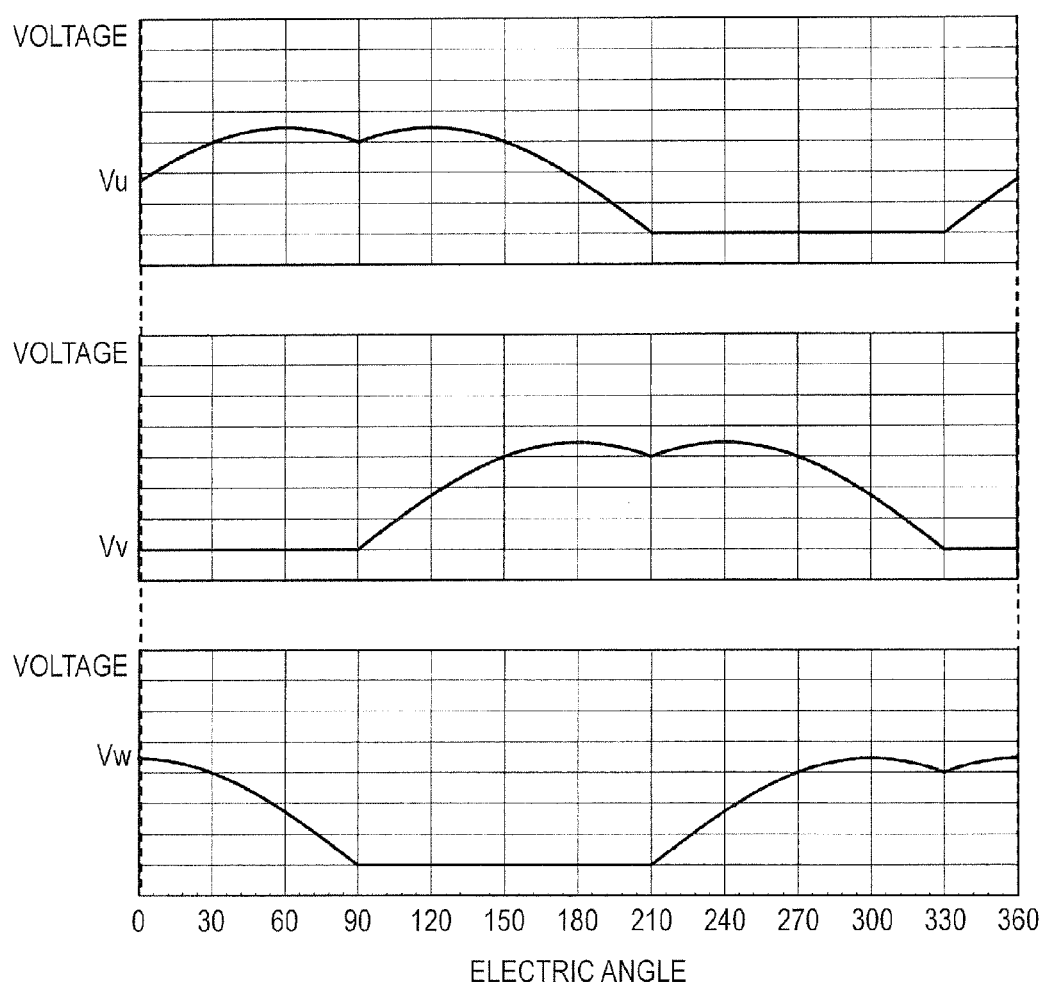
FIG. 5 is an explanatory diagram illustrating the operating principle of the sine wave drive voltage controller in FIG. 2.
Figure 6:
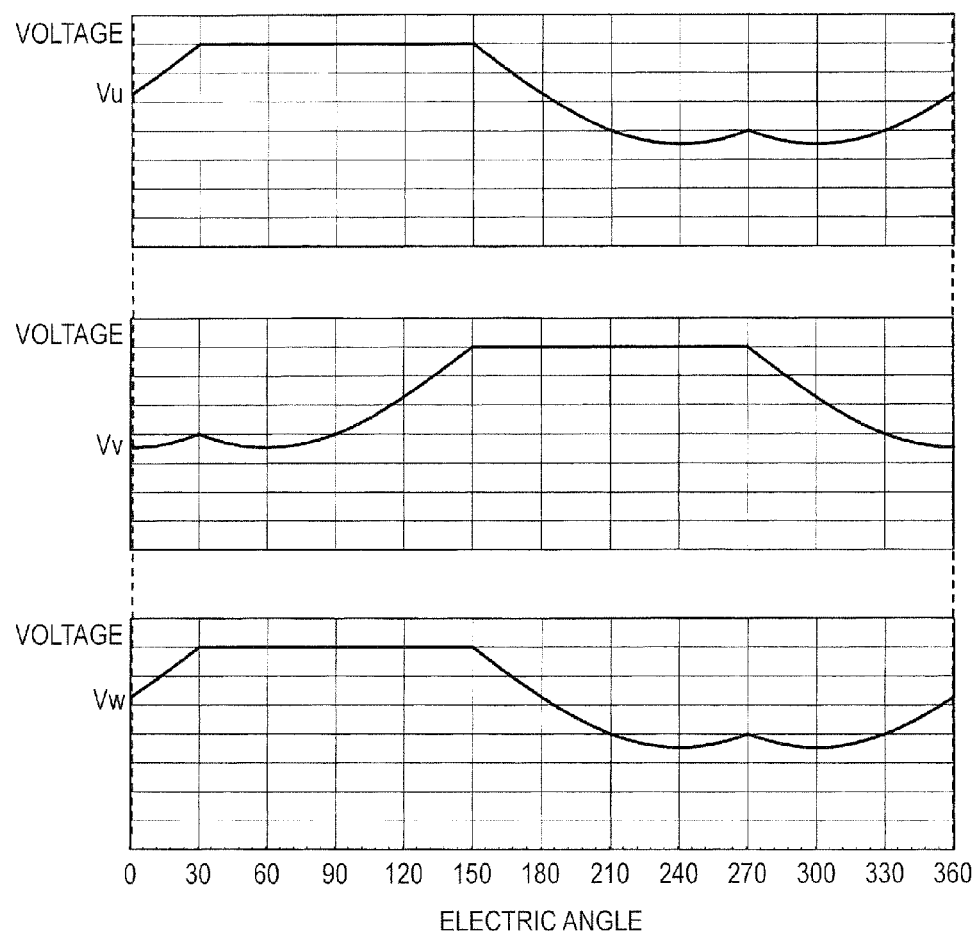
FIG. 6 is an explanatory diagram illustrating the operating principle of the sine wave driver voltage controller in FIG. 2.

FIG. 5 illustrates voltage waveforms of the phases in the case of fixing the voltage minimum phase in the sinusoidal voltages Vu, Vv, and Vw of three phases illustrated in FIG. 4 to the ground power supply voltage GND (in the specification, called GND fixation). For example, in FIG. 4, in the period of the electrical angles of 210 degrees to 330 degrees, the u phase is the smallest phase of the voltage. In FIG. 5, relative voltage waveforms of the v phase and the w phase in the case of applying the GND fixation to the sinusoidal voltage Vu of the u phase in the period are illustrated. FIG. 6 illustrates the voltage waveforms of the phases in the case of fixing the maximum phase of the voltage in the sinusoidal voltages Vu, Vs, and Vw of the three phases illustrated in FIG. 4 to the power supply voltage VM in a manner similar to the case of FIG. 5.

Figure 7:
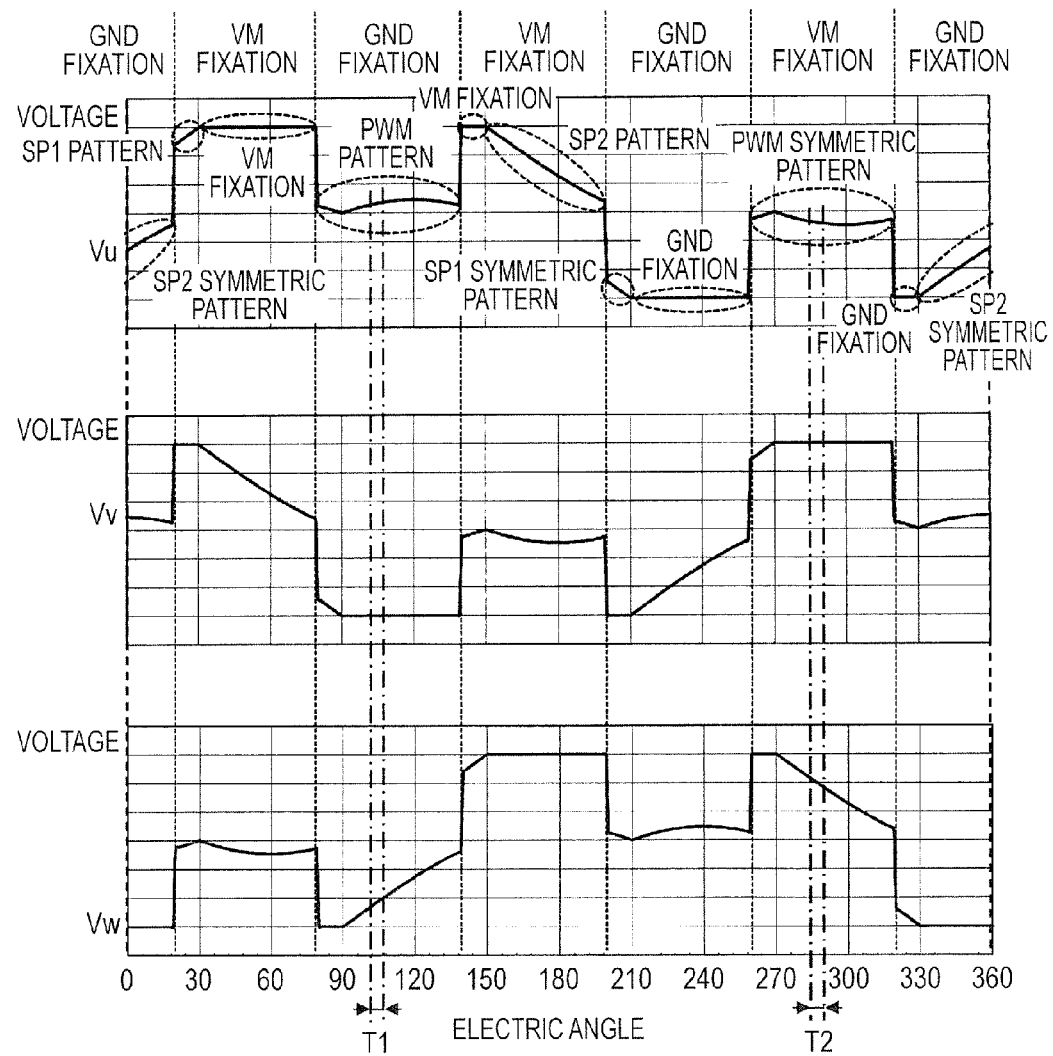
FIG. 7 is an explanatory diagram illustrating the operating principle of the sine wave drive voltage controller in FIG. 2.

In the case of alternately applying the GND fixation of FIG. 5 and the VM fixation of FIG. 6 every electrical angle of 60 degrees, voltage waveforms as illustrated in FIG. 7 are resulted. As illustrated in FIG. 7, the voltage waveform of the u phase (also the v phase and the w phase) can be generated by the SPI pattern, PWM pattern, SP2 pattern, symmetric patterns of those patterns, the VM fixation, and the GND fixation. The period of the electric angles from 0 degree to 360 degrees illustrated in FIG. 7 corresponds to, for example, a period of about 100 PWM cycles.

For example, in the PWM cycle in period T1 illustrated in FIG. 7, it is sufficient to apply the PWM pattern to the u phase and apply the SP2 symmetric pattern to the w phase in a state where the GND fixation is applied to the v phase. In the PWM cycle in the period T2, it is sufficient to apply the PWM symmetric pattern to the u phase and apply the SP2 pattern to the w phase in a state where the VM fixation is applied to the v phase. Similarly, in each of the PWM cycles, it is sufficient to apply the GND fixation or VM fixation to any one of the three phases, apply the PWM pattern or the PWM symmetric pattern to another phase, and apply the SP1 pattern, the SP2 pattern, or a symmetric pattern of any of those patterns to the remaining phase.

Based on such a principle, the PWM pattern generator PPG preliminarily holds a duty instruction value for each PWM cycle in a table or the like, for example, to realize voltage fluctuations of the PWM pattern illustrated in FIG. 7, and generates the duty instruction value PWMP on the basis of the table. The duty instruction value PWMP is expressed, although not limited, a count value based on the reference clock of the digital control in practice.

In the table, for example, a normalized duty instruction value (for example, a count value) is held. The PWM pattern generator PPG generates the duty instruction value PWMP by performing weighting based on the PWM on count number from the PI compensator PICP on the normalized duty instruction value. As a result, the PWM pattern generator PPG can generate the duty instruction value PWMP for performing sine-wave driving the spindle motor SPM, in which the current error is reflected.

Similarly, the soft pattern generator SPG preliminarily holds a duty instruction value for each PWM cycle in a table or the like, for example, to realize voltage fluctuations of the soft patterns (SP1 pattern and SP2 pattern) illustrated in FIG. 7, and generates the duty instruction value (for example, count value) SOFTP on the basis of the table. The soft pattern generator SPG also performs weighting in a manner similar to the PWM pattern generator PPG and, as a result, can generate the duty instruction value SOFTP for performing sine-wave driving the spindle motor SPM, in which the current error is reflected.

The output controller OUTCT has a PWM corrector PWMCP and a PWM signal generator PWMG. The PWM corrector PWMCP has a PWMP corrector PPCP and an SOFTP corrector and, as the details will be described later, corrects the duty instruction values PWMP and SOFTP from the sine wave drive voltage controller (duty instruction unit) SINCT and outputs corrected duty instruction values PWMR and SOFTR.

On the basis of the corrected duty instruction values PWMR and SOFTR, the PWM signal generator PWMG generates a PWM signal PWMON_MODu for the u phase, a PWM signal PWMON_MODv for the v phase, and a PWM signal PWMON_MODw for the w phase. Concretely, the PWM signal generator PWMG fixes any one phase of the PWM signal of the three phases to the on period or the off period in each PWM cycle on the basis of the driving method of FIG. 7 (that is, VM fixation or GND fixation is performed). The PWM signal generator PWMG determines the on period of the PWM signal of another phase by one of the corrected duty instructed values PWMR and SOFTR and determines the on period of the PWM signal of the remaining one phase by the other one of the corrected duty instruction values PWMR and SOFTR.

At this time, the PWM signal generator PWMG has to alternately switch the GND fixation and the VM fixation every 60 degrees as illustrated in FIG. 7. The PWM signal generator PWMG performs the switching of every 60 degrees on the basis of current passage timings from the PLL controller PLLCT. As described above, the duty instruction values PWMP and SOFTP corresponding to the PWM pattern and the soft pattern are output from the sine wave drive voltage controller SINCT. In reality, however, symmetric patterns of the PWM pattern and the soft patterns are also necessary as illustrated in FIG. 7. The PWM signal generator PWMG internally calculates the duty instruction values corresponding to the symmetric patterns by digital computation and also generates PWM signals in which they are reflected.

As described above, by using the driving method of FIG. 7, it is sufficient for the PWM signal generator PWMG to have two, not three, real circuits generating the PWM signals on the basis of the corrected duty instruction values (count values), so that the circuit area can be reduced. Since control is performed with an amplitude from the VM fixation or GND fixation by using the driving method of FIG. 7, it is advantageous with respect to the power supply voltage margin, the motor torque constant can be made large, and consumption power can be reduced.

Figure 3:
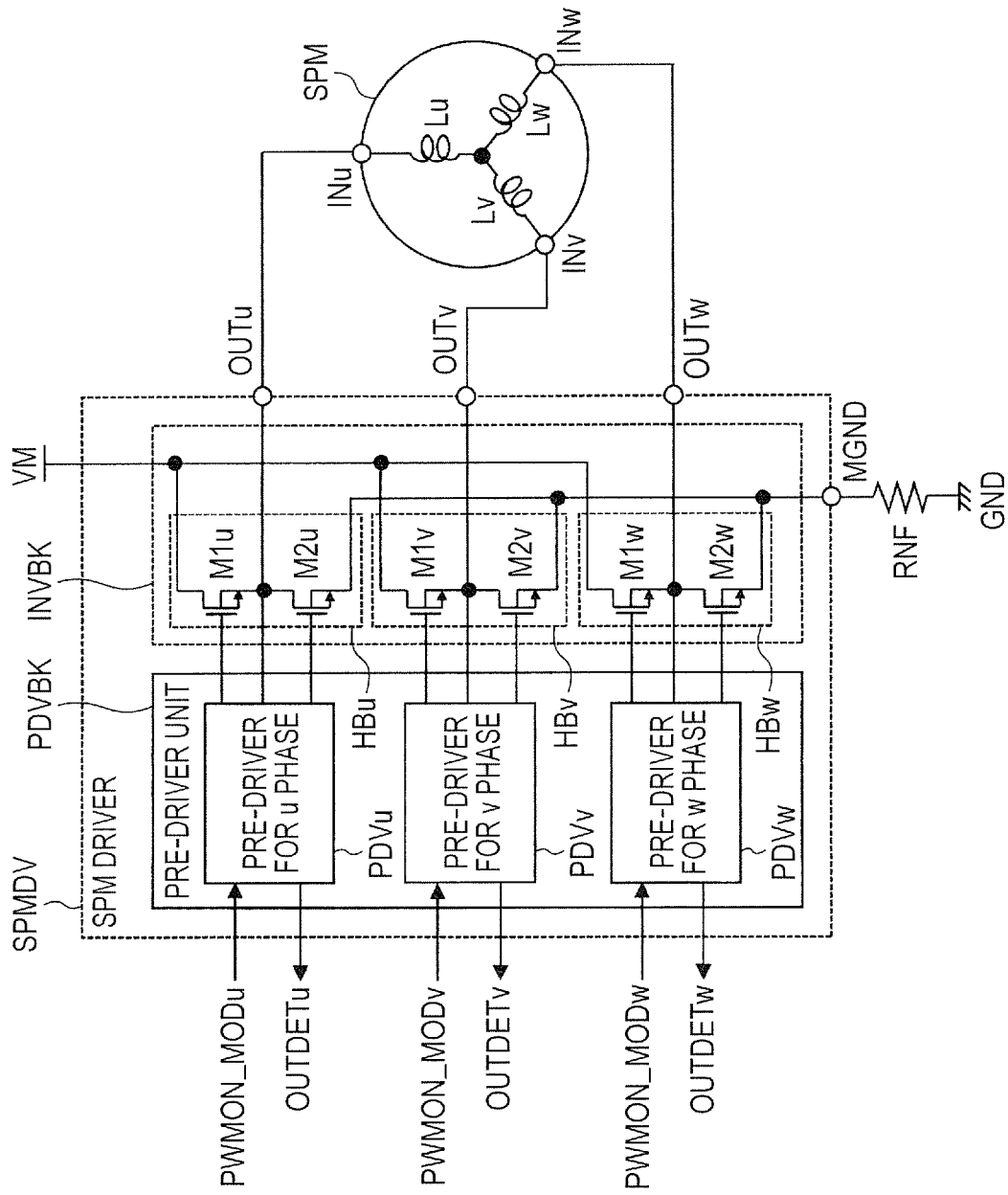
FIG. 3 is a circuit block diagram illustrating a configuration example of an SPM driver in FIG. 2.

FIG. 3 is a circuit block diagram illustrating a configuration example of the SPM driver SPMDV in FIG. 2. The SPM driver SPMDV has a pre-driver unit PDVBK and an inverter INVBK. The inverter unit INVBK has a half-bridge circuit HBu for the u phase, a half-bridge circuit HBv for the v phase, and a half-bridge circuit HBw for the w phase.

The half-bridge circuit HBu for the u phase has a high-side transistor M1$u$ and a low-side transistor M2$u$. Similarly, the half-bridge circuit HBv for the v phase has a high-side transistor M1$v$ and a low-side transistor M2$v$, and the half-bridge circuit HBw has a high-side transistor M1$w$ and a low-side transistor M2$w$. The high-side transistors M1$u$, M1$v$, and M1$w$ and the low-side transistors M2$u$, M2$v$, and M2$w$ are nMOS transistors in this case.

The drains of the high-side transistors (nMOS transistors) M1$u$, M1$v$, and M1$w$ are commonly coupled to the power supply voltage VM, and the sources of the low-side transistors (nMOS transistors) M2$u$, M2$v$, and M2$w$ are commonly coupled to the motor ground terminal MGND. The source of the high-side transistor M1$u$ and the drain of the low-side transistor M2$u$ are coupled to a drive output terminal for the u phase (OUTu). Similarly, the high-side transistor M1$v$ and the low-side transistor M2$v$ are coupled to a drive output terminal for the v phase (OUTv), and the high-side transistor M1$w$ and the low-side transistor M2$w$ are coupled to a drive output terminal for the w phase (OUTw). The motor ground terminal MGND is coupled to the ground power supply voltage GND via the current detection resistor RNF.

The drive output terminal for the u phase (OUTu), the drive output terminal for the v phase (OUTv), and the drive output terminal for the w phase (OUTw) are coupled to a drive input terminal PINu for the u phase, a drive input terminal PINv for the v phase, and a drive input terminal PINw for the w phase of the spindle motor SPM, respectively. The spindle motor SPM includes a u-phase coil Lu, a v-phase coil Lv, and a w-phase coil Lw which are coupled in a Y shape equivalently.

The pre-driver unit PDVBK has a u-phase pre-driver PDVu, a v-phase pre-driver PDVv, and a w-phase pre-driver PDVw. The u-phase pre-driver PDVu drives the half-bridge circuit HBu for the u phase on the basis of the PWMON_MODu for the u phase from the PWM signal generator PWMG. Similarly, the v-phase pre-driver PDVv and the w-phase pre-driver PDVw drive the half-bridge circuit HBv for the v phase and the half-bridge circuit HBw for the w phase on the basis of the PWM signal PWMON_MODv for the v phase and the PWM signal PWMON_MODw for the w phase, respectively.

Referring again to FIG. 2, the PWM signal generator PWMG outputs the PWM signal to the SPM driver SPMDV while performing switching every 60 degrees as described above. Since the motor drive current has a sine wave shape, as a current detected by the current detection resistor RNF, a current in which waves each having a vertex are repeated in cycles of 60 degrees. The current error detector ERRDET has an instruction current corrector CRNTCP generating a digital pattern obtained by copying the waveforms of the sine waves. The current error detector ERRDET multiplies the current instruction value SPNCRNT with the digital pattern from the instruction current corrector CRNTCP and outputs the multiplication result to the subtracter SB1 in place of the current instruction value SPNCRNT.

The advance controller PHCT has a drive voltage phase generator PHG and a peak storage PKHD. The drive voltage phase generator PHG outputs phase information θdrv to the sine wave drive voltage controller SINCT to perform so-called advance control. The sine wave drive voltage controller SINCT shifts the PWM pattern and the soft patterns on the basis of the phase information θdrv and generates the duty instruction values PWMP and SOFTP by using the shifted patterns.

More specifically, the spindle motor SPM is expressed by an equivalent circuit including, in addition to the coils Lv, Lu, and Lw illustrated in FIG. 3, an AC voltage source generating back electromotive force (B-EMF), and a resistor. To maximize the torque of the motor, the phase of current flowing in the equivalent circuit and the phase of the AC voltage source (back electromotive force (B-EMF)) have to be matched. Consequently, the sine wave drive voltage controller SINCT has to apply a sinusoidal voltage whose phase is advanced more than the phase of the AC voltage source (back electromotive force (B-EMF)) to the motor. The phase information θdrv expresses the magnitude of the advance phase.

Concretely, the drive voltage phase generator PHG calculates the phase information θdrv by performing predetermined arithmetic operation using an amplitude value ISPNOUT of the drive current of the motor and the rotation cycle count value NCNT (that is, rotational speed of the motor) as variables and using the resistance value of the resistor in the above-described equivalent circuit, the inductance value of the coil, and the like as constants. The peak storage PKHD stores the digital value from the analog/digital converter ADC in accordance with a trigger signal UPADC from the instruction current corrector CRNTCP, thereby determining the amplitude value ISPNOUT used in the drive voltage phase generator PHG. The instruction current corrector CRNTCP outputs, for example, the trigger signal UPADC in the position of the maximum amplitude of the digital pattern generated.

The serial IF & register unit SIFREG has a serial port SIF and a parameter setting register REG which is accessed via the serial port SIF. The parameter setting register REG holds, for example, phase setting parameters K1 and K2 and current control parameters Kcp and Kci set by the HDD controller HDDCT in FIG. 1. The phase setting parameters K1 and K2 are used in the drive voltage phase generator PHG and express constant of the resistance value, the inductance value, and the like. The current control parameters Kcp and Kci are used by the PI compensator PICP. Further, as the details will be described, the parameter setting register REG holds a PWM correction parameter KREVxx used in the PWM compensator PWMCP.

Configuration and Schematic Operation of Pre-Driver

Figure 8:
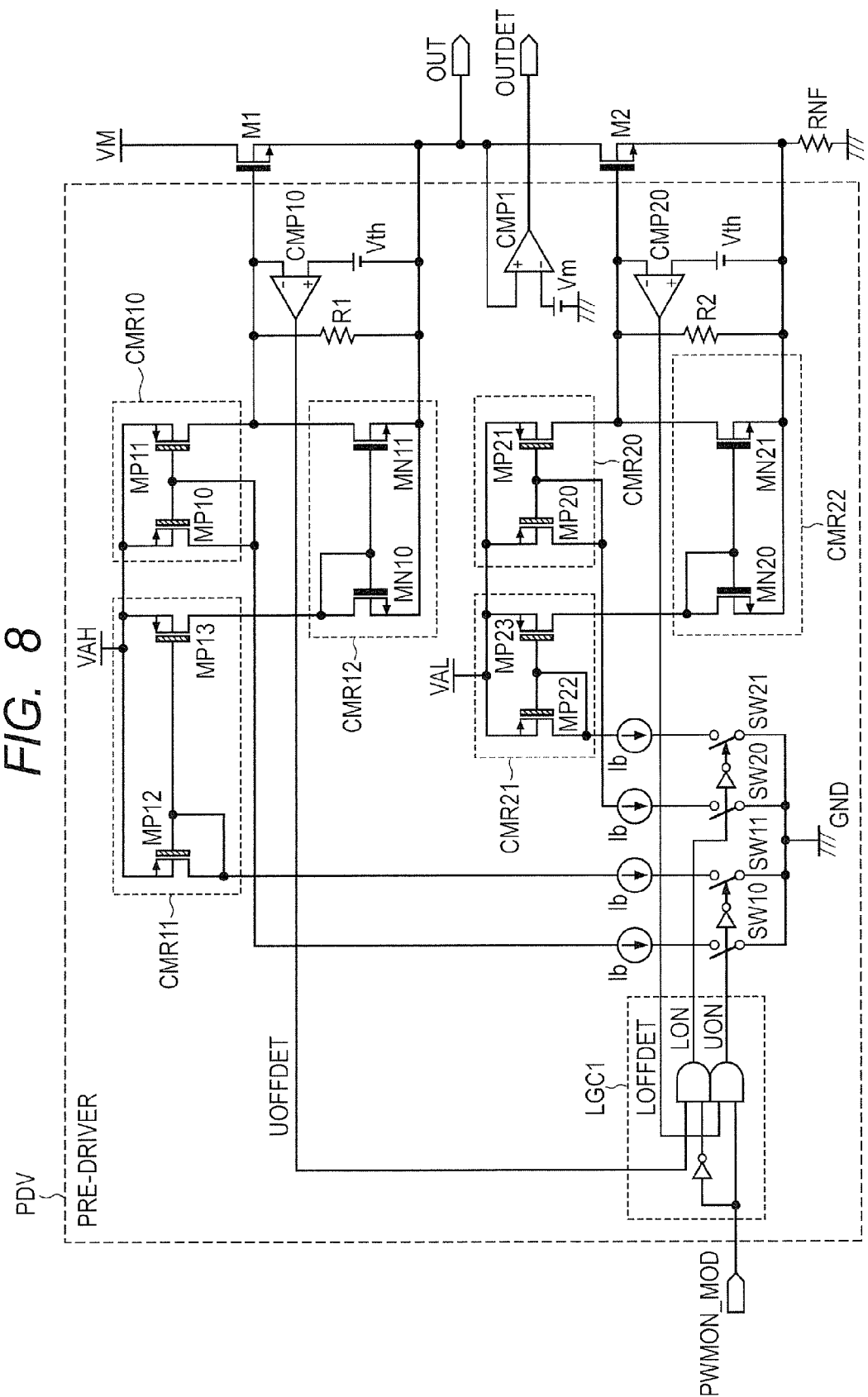
FIG. 8 is a circuit diagram illustrating a configuration example of pre-drivers for phases in an SPM driver in FIG. 3.

FIG. 8 is a circuit diagram illustrating a configuration example of a pre-driver of each phase in the SPM driver SPMDV in FIG. 3. Each of the pre-driver PDVu for the u phase, the pre-driver PDVv for the v phase, and the pre-driver PDVw for the w phase in FIG. 3 has a configuration as illustrated in FIG. 8. The pre-driver PDV of FIG. 8 has current mirror circuits CMR10, CMR11, and CMR12 and a resistor R1 for driving a high-side transistor (nMOS transistor) M1 and current mirror circuits CMR20, CMR21, and CMR22 and a resistor R2 for driving a low-side transistor (nMOS transistor) M2. The high-side and low-side transistors M1 and M2 output a drive output signal OUT to a drive output terminal.

The pre-driver PDV also has switches SW10 and SW11 and two reference current sources (Ib) for on/off controlling the high-side transistor M1 and switches SW20 and SW21 and two reference current sources (Ib) for on/off controlling the low-side transistor M2. Further, the pre-driver PDV has a control logic circuit LGC1 for on/off controlling the switches SW10, SW11, SW20, and SW21 and three comparator circuits CMP1, CMP10, and CMP20.

On the high side, the current mirror circuit CMR10 is configured by pMOS transistors MP10 and MP11, the current mirror circuit CMR11 is configured by pMOS transistors MP12 and MP13, and the current mirror circuit CMR12 is configured by nMOS transistors MN10 and MN11. Similarly, on the low side, the current mirror circuit CMR20 is configured by pMOS transistors MP20 and MP21, the current mirror circuit CMR21 is configured by pMOS transistors MP22 and MP23, and the current mirror circuit CMP22 is configured by nMOS transistors MN20 and MN21.

The two switches SW10 and SW11 corresponding to the high side are on/off controlled complementarily. In the case where the switch SW10 is on (SW11 is off), the current mirror circuit CMR10 is made active, and the current mirror circuits CMR11 and CMR12 are made inactive. Concretely, in response to the turn-on of the switch SW10, the reference current Ib is input to the pMOS transistor MP10 of the current mirror circuit CMR10, and current according to the current ratio (size ratio of the transistors) of the current mirror circuit CMR10 is transferred to the pMOS transistor MP11. As a result, the capacitance between the gate and the source in the high-side transistor M1 is charged and the high-side transistor M1 is controlled in the on state.

On the other hand, in the case where the switch SW11 is on (SW10 is off), the current mirror circuit CMR10 is made inactive, and the current mirror circuits CMR11 and CMR12 are made active. Concretely, in response to the turn-on of the switch SW11, the reference current Ib is input to the pMOS transistor MP12 of the current mirror circuit CMR11, and current according to the current ratio of the current mirror circuit CMR11 is transferred to the pMOS transistor MP13. The current mirror circuit CMR12 receives the current by the nMOS transistor MN10 and transfers it to the nMOS transistor MN11. As a result, the capacitance between the gate and the source in the high-side transistor M1 is discharged and the high-side transistor M1 is controlled in the off state. The discharging operation is performed also in a path via the resistor R1 having a high resistance value.

Also in the low side, similar operation is performed with a configuration similar to that in the case of the high side. Briefly, first, the two switches SW20 and SW21 corresponding to the low side are complementarily on/off controlled. In the case where the switch SW20 is on (SW21 is off), the current mirror circuit CMR20 is made active, and the current mirror circuits CMR21 and CMR22 are made inactive. Concretely, in response to the turn-on of the switch SW20, the current mirror circuit CMR20 outputs the input reference current Ib at predetermined current ratio. As a result, the capacitance between the gate and the source in the low-side transistor M2 is charged and the low-side transistor M2 is controlled to the on state.

On the other hand, in the case where the switch SW21 is on (SW20 is off), the current mirror circuit CMR20 is made inactive, and the current mirror circuits CMR21 and CMR22 are made active. Concretely, in response to the turn-on of the switch SW21, the current mirror circuit CMR21 outputs the input reference current Ib at a predetermined current ratio. The current mirror circuit CMR22 receives the current and sends it back at a predetermined current ratio. As a result, the capacitance between the gate and the source in the low-side transistor M2 is discharged and the low-side transistor M2 is controlled in the off state. The discharging operation is performed also in a path including the resistor R2 having a high resistance value.

Charge time and discharge time of the capacitance between the gate and source of the high-side transistor M1 and the low-side transistor M2 can be properly adjusted according to the magnitude of the reference current Ib. Although not limited, the power supply voltage VM of the high-side transistor M1 is 5V or the like, and the power supply voltage VAL of the current mirror circuits CMR20 and CMR21 on the low side is also 5V or the like. On the other hand, the power supply voltage VAH of the current mirror circuits CMR10 and CMR11 on the high side is 10V or the like.

The comparator circuit CMP10 compares the gate-source voltage of the high-side transistor M1 with a predetermined threshold Vth, thereby detecting the off state of the high-side transistor M1. During a period in which the off state of the high-side transistor M1 is detected, the comparator circuit CMP10 asserts a high-side off detection signal UOFFDET to the "H" level. Similarly, in a period in which the off state of the low-side transistor M2 is detected, the comparator circuit CMP20 asserts a low-side off detection signal LOFFDET to the "H" level.

The comparator circuit CMP1 compares the drive output signal OUT with an intermediate voltage Vm and outputs an output detection signal OUTDET. The intermediate voltage Vm is determined as an intermediate of the maximum voltage and the minimum voltage of the drive output signal OUT. As a result, the duty of the output detection signal OUTDET expresses the duty of the drive output signal OUT. The control logic circuit LGC1 receives the PWM signal PWMON_MOD, the high-side off detection signal UOFFDET, and the low-side off detection signal LOFFDET and outputs a low-side on signal LON and a high-side on signal UON.

Concretely, the control logic circuit LGC1 asserts the high-side on signal UON to the "H" level only in a period that the PWM signal PWMON_MOD is at the "H" level and the low-side off detection signal LOFFDET is at the "H" level (assert). In response to the asserting of the high-side on signal UON, the switch SW10 is controlled to be on (the switch SW11 is controlled to be off). The control logic circuit LGC1 asserts the low-side on signal LON to the "H" level only in a period that the PWM signal PWMON_MOD is at the "L" level and the high-side off detection signal UOFFDET is at the "H" level (assert). In response to the asserting of the low-side on signal LON, the switch SW20 is controlled to be on (the switch SW21 is controlled to be off).

Consequently, as schematic operation, in the period in which the PWM signal PWMON_MOD is at the "H" level, the high-side transistor M1 is controlled to be on (the low-side transistor M2 is controlled to be off), and the drive output signal OUT becomes the "H" level (almost the level of the power supply voltage VM). On the other hand, in the period that the PWM signal PWMON_MOD is at the "L" level, the low-side transistor M2 is controlled to be on (the high-side transistor M1 is controlled to be off), and the drive output signal OUT becomes the "L" level (almost the level of the ground power supply voltage GND).

Accompanying such operation, ideally, the duty of the drive output signal OUT becomes equal to that of the PWM signal PWMON_MOD. As described above, when the duty of the PWM signal PWMON_MOD is used, the spindle motor SPM can be sine-wave driven with high precision. Therefore, if the duty of the drive output signal OUT and that of the PWM signal PWMON_MOD are equal, by increasing the precision of the sine wave drive, vibration and noise of the spindle motor SPM can be reduced. In reality, however, an error may occur between the duties as will be described later.

Detailed Operation of Pre-Driver

Figure 9A:
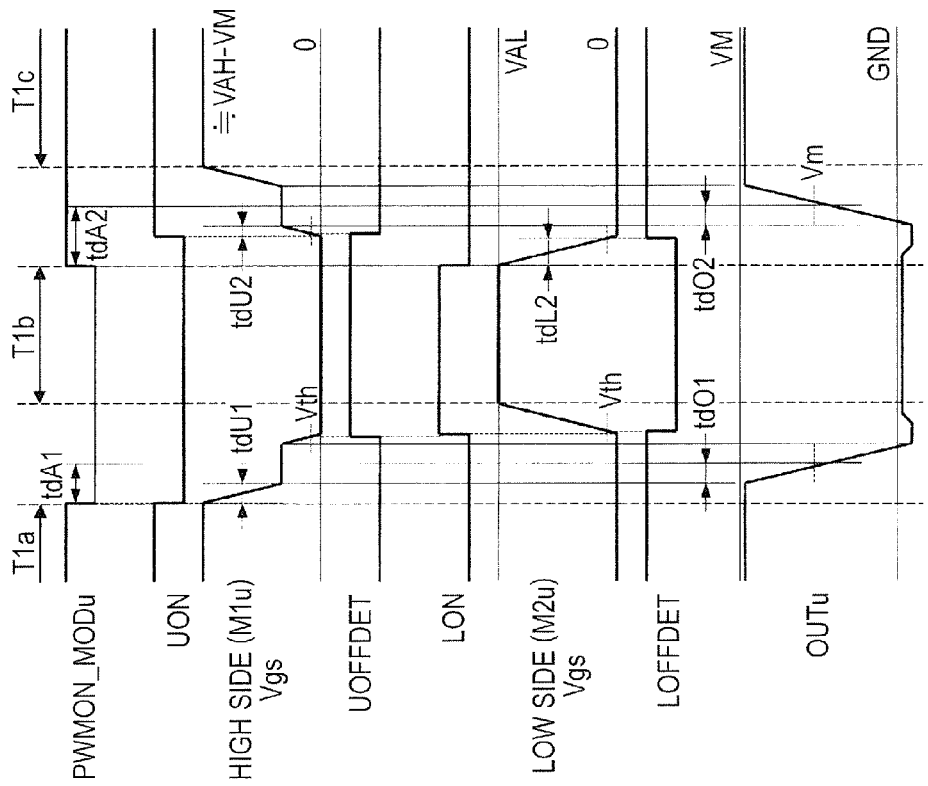
FIG. 9A is an explanatory diagram illustrating an operation example at the time of current source in the SPM driver in FIG. 3.
Figure 9B:
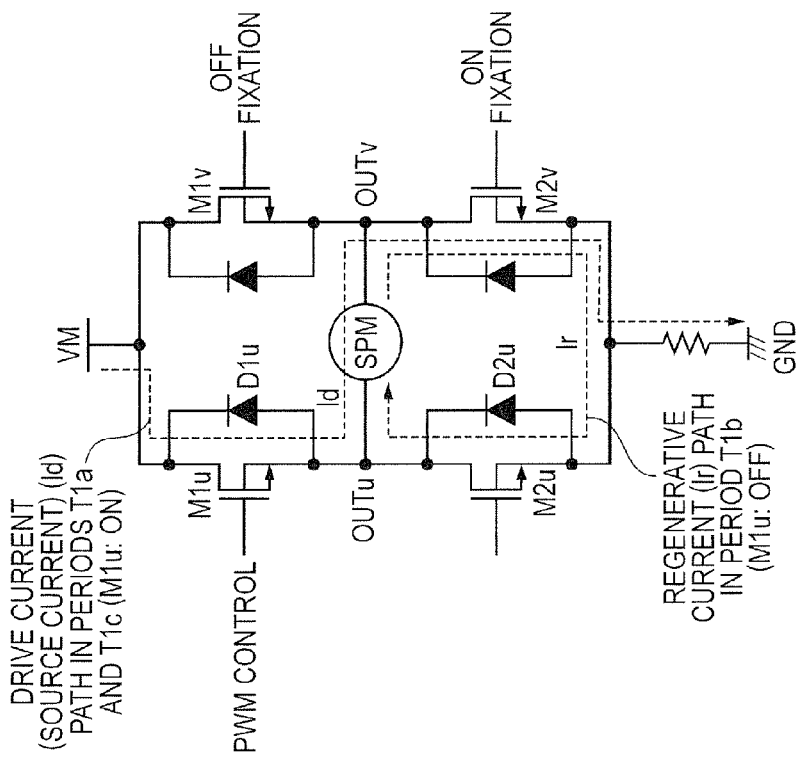
FIG. 9B is a waveform chart illustrating a detailed operation example of the pre-drivers corresponding to the operation of FIG. 9A.

FIG. 9A is an explanatory diagram illustrating an operation example at the time of current source in the SPM driver SPMDV in FIG. 3, and FIG. 9B is a waveform chart illustrating a detailed operation example of a pre-driver corresponding to the operation of FIG. 9A. FIG. 9A illustrates an extracted part of the high-side transistor M1$u$ and the low-side transistor M1$u$ for the u phase and the high-side transistor M1$v$ and the low-side transistor M2$v$ for the v phase in the SPM driver SPMDV in FIG. 3. The time of current source denotes, for example, a state where one phase (in this case, the v phase) of the drive output signal OUT of the three phases is determined to the GND fixation and the high-side transistors of the other two phases (in this case, the u and w phases) are controlled by the PWM signal.

In the example of FIG. 9A, the low-side transistor M2$v$ for the v phase is fixed to the on state, so that the drive output signal OUTv for the v phase is determined to the GND fixation, and the high-side transistor M1$u$ for the u phase is controlled by the PWM signal in this state. In the on period of the PWM signal, the high-side transistor M1$u$ for the u phase is controlled to the on state, and the low-side transistor M2$u$ is controlled to the off state. In the on period, the high-side transistor M1$u$ becomes a drive transistor. By configuring a path of supplying current to the low-side transistor M2$v$ which is on-fixed, drive current (source current) Id is passed to the spindle motor SPM.

On the other hand, in the off period of the PWM signal, the high-side transistor M1$u$ for the u phase is controlled to be off, and the low-side transistor M2$u$ is controlled to be on. In the off period, the low-side transistor M2$u$ becomes a regenerative transistor and passes regenerative current Ir from the spindle motor SPM in cooperation with the low-side transistor M2$v$ which is on-fixed. The low-side transistor M2$u$ has a body diode D2$u$ in practice and can also pass the regenerative current Ir via the body diode D2$u$.

FIG. 9B illustrates an operation waveform example of the pre-driver PDVv for the u phase in the case where the high-side transistor M1$u$ for the u phase in the on state (corresponding to period T1$a$) is controlled to the off state (corresponding to period T1$b$) and is controlled again to the on state (corresponding to period T1$c$). For convenience, each of the periods T1$a$, T1$b$, and T1$c$ in FIG. 9B is expressed as a period of a steady state. In FIG. 9B, the states of transition periods between the steady states are illustrated specifically.

As illustrated in the period T1$a$, in the on period (corresponding to the "H" level in this case) of the PWM signal PWMON_MODu, the voltage level of the drive output signal OUTu becomes "VM−IdXRon1" (Ron1 denotes on resistance of M1$u$). When the PWM signal PWMON_MODu shifts from the on period to the off period (corresponding to the "L" level") in this state, the high-side on signal UON is negated to the "L" level. In response, the gate-source capacitance in the high-side transistor M1$u$ is discharged, and the gate-source voltage Vgs decreases.

When current which can be supplied by the high-side transistor M1u decreases to the drive current Id, the drive output signal OUTu decreases and becomes negative voltage, so that the regenerative current Ir from the motor starts flowing in the path including the body diode D2u. As a result, the drive output signal OUTu becomes "GND−Vf2" (Vf2 denotes forward voltage of the body diode D2u). In the falling period, the source-drain voltage fluctuates (rises) in the high-side transistor M1u, so that the gate-source voltage Vgs is maintained almost constant by the influence of charge/discharge or the like of parasite capacitance of the transistor. When the falling of the drive output signal OUTu stops, the gate-source voltage Vgs of the high-side transistor M1u decreases again toward 0V.

In FIG. 9B, delay time from the time point when the PWM signal PWMON_MODu shifts from the on period ("H" level) to the off period ("L" level) to the time point when the falling of the drive output signal OUTu starts is expressed as tdU1. Delay time since the time point when the falling of the drive output signal OUTu starts until the time point when the drive output signal OUTu falls to the intermediate voltage Vm is expressed as tdO1. In this case, the drive output signal OUTu falls after delay time tdA1 (=tdU1+td01) since the PWM signal PWMON_MODu shifts from the on period to the off period.

After that, when the gate-source voltage Vgs of the high-side transistor M1u decreases below the threshold voltage Vth, the high-side off detection signal UOFFDET is asserted to the "H" level and, in response to this, the low-side on signal LON is asserted to the "H" level. As a result, in the low-side transistor M2u, the gate-source capacitance is charged and the gate-source voltage Ygs rises toward the maximum voltage level (=VAL). When the low-side transistor M2u is turned on, the regenerative current Ir flows via the low-side transistor M2u. Consequently, as illustrated in the period T1b, the voltage level of the drive output signal OUTu becomes "GND−IrXRon2" (Ron2 denotes on resistance of M2u).

When the PWM signal PWMON_MODu shifts from the off period to the on period, the low-side on signal LON is negated to the "L" level. In response to this, in the low-side transistor M2u, the gate-source voltage Vgs decreases toward 0V. When the gate-source voltage Vgs of the low-side transistor M2u decreases below the threshold voltage Vth, the low-side off detection signal LOFFDET is asserted to the "H" level and, in response, the high-side on signal UON is asserted to the "H" level.

As a result, in the high-side transistor M1u, the gate-source voltage Vgs rises and current which can be supplied in the high-side transistor M1u increases. When the current which can be supplied in the high-side transistor M1u increases to a level that drive current can be passed to the motor, the motor regenerating operation shifts to the motor driving operation using the high-side transistor M1u.

When the operation shifts to the motor driving operation, the drive output signal OUTu rises toward "VM−IdXRon1" accompanying the drive current Id of the high-side transistor M1u. In the rise period, in the high-side transistor M1u, the source-drain voltage fluctuates (decreases), so that the gate-source voltage Vgs is maintained almost constant. When the rising of the drive output signal OUTu stops, the gate-source voltage Vgs of the high-side transistor M1u rises again toward the maximum voltage level (almost equal to VAH−VM), and reaches the period T1c of the steady state.

In FIG. 9B, delay time from the time point when the PWM signal PWMON_MODu shifts from the off period ("L" level) to the on period ("H" level) to the time point when the low-side transistor M2u shifts from the on state to the off state (that is, the LOFFDET is asserted) is expressed as tdL2. Delay time since the time point when the low-side transistor M2u shifts to off until the time point when rising of the drive output signal OUTu starts in response to the transition from off to on of the high-side transistor M1u is expressed as tdU2.

Further, delay time from the time point when rising of the drive output signal OUTu starts to the time point when the drive output signal OUTu rises to the intermediate voltage Vm is expressed as tdO2. In this case, the drive output signal OUTu rises after the delay time tdA2 (=tdL2+tdU2+tdO2) since the PWM signal PWMON_MODu shifts from the off period to the on period.

As described above, in the case where the high-side transistor M1u performs a current source operation, in the drive output signal OUTu, a falling delay of the delay time tdA1 occurs at the time of transition from the on period to the off period of the PWM signal PWMON_MODu, and a rise delay of the delay time tdA2 occurs at the time of transition from the off period to the on period. As understood from FIG. 9B, the delay time tdA2 is longer than the delay time tdA1.

The reason is that, in the case of controlling the drive transistor (in this case, the high-side transistor M1u) from the off state to the on state, as a pre-process, a control of the regenerative transistor (in this case, the low-side transistor M2u) from the on state to the off state (that is, delay time tdL2) becomes necessary. As a result, an error occurs between the duty of the PWM signal PWMON_MODu and the duty of the drive output signal OUTu. Concretely, the actual on period (in this case, the "H" pulse width) in the drive output signal OUTu becomes shorter as compared with the on period (the "H" level) of the PWM signal PWMON_MODu. In other words, the duty of the drive output signal OUTu becomes smaller than the duty of the PWM signal PWMON_MODu.

Figure 10B:
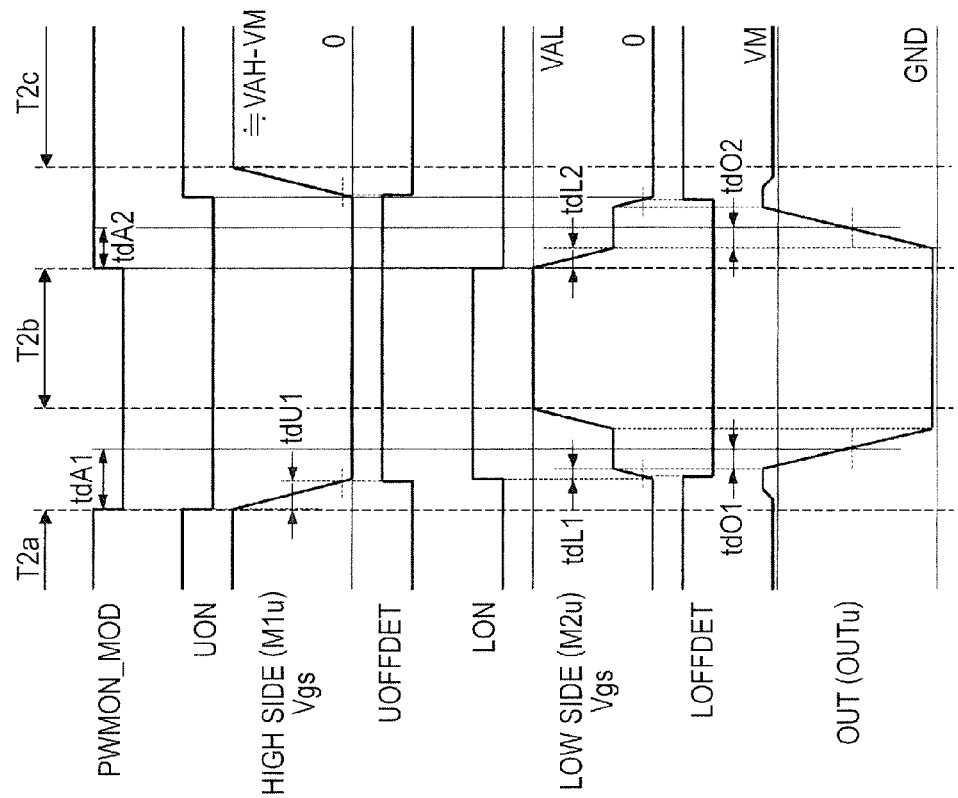
FIG. 10B is a waveform chart illustrating a detailed operation example of the pre-drivers corresponding to the operation of FIG. 10A.
Figure 10A:
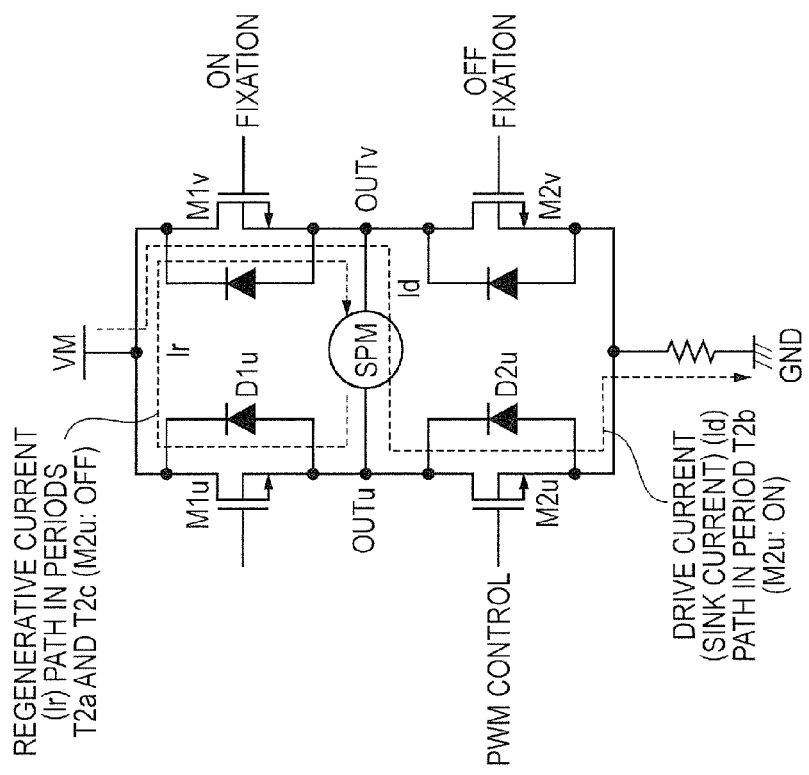
FIG. 10A is an explanatory diagram illustrating an operation example at the time of current sink in the SPM driver in FIG. 3.

FIG. 10A is an explanatory diagram illustrating an operation example at the time of current sink in the SPM driver SPMDV in FIG. 3, and FIG. 10B is a waveform chart illustrating a detailed operation example of a pre-driver corresponding to the operation of FIG. 10A. FIG. 10A illustrates, in a manner similar to the case of FIG. 9A, the part of the high-side transistor M1u and the low-side transistor M2u for the u phase and the high-side transistor M1v and the low-side transistor M2v for the v phase. The time of current sink denotes, for example, like the PWM cycle (the second PWM cycle) in the period T2 in FIG. 7, a state where one phase (in this case, the v phase) of the drive output signal OUT of the three phases is determined to the VM fixation and the low-side transistors of the other two phases (in this case, the u and w phases) are controlled by the PWM signal.

In the example of FIG. 10A, the high-side transistor M1v for the v phase is fixed to the on state, so that the drive output signal OUTv for the v phase is determined to the VM fixation, and the low-side transistor M2u for the u phase is controlled by the PWM signal in this state. In the on period of the PWM signal, the low-side transistor M2u for the u phase is controlled to the on state, and the high-side transistor M1u is controlled to the off state. In the off period, the low-side transistor M2u becomes a drive transistor. By configuring a path of drawing current from the high-side transistor M1v which is on-fixed, the drive current (sink current) Id is passed to the spindle motor SPM.

On the other hand, in the off period of the PWM signal, the low-side transistor M2u for the u phase is controlled to be off, and the high-side transistor M1u is controlled to be on. In the off period, the high-side transistor M1u becomes a regenerative transistor and passes the regenerative current Ir from the spindle motor SPM in cooperation with the high-side transistor M1v which is on-fixed. The high-side transistor M1u has a body diode D1u in practice and can also pass the regenerative current Ir via the body diode D1u.

FIG. 10B illustrates, in a manner similar to FIG. 9B, an operation waveform example of the pre-driver PDVv for the u phase in the case where the high-side transistor M1u for the u phase in the on state (corresponding to period T2a) is controlled to the off state (corresponding to period T2b) and is controlled again to the on state (corresponding to period T2c). For convenience, each of the periods T2a, T2b, and T2c in FIG. 10B is expressed as a period of a steady state. In FIG. 10B, the states of transition periods between the steady states are illustrated specifically.

In FIG. 9B, the drive transistor is the high-side transistor M1u. In contrast, in FIG. 10B, the drive transistor is the low-side transistor M2u. Consequently, in the operation of FIG. 10B, the period in which the motor driving operation is performed and the period in which the motor regenerating operation is performed are replaced in FIG. 10B as compared with the operations of FIG. 9B. Although the motor driving operation is performed in the periods T1a and T1c in FIG. 9B, the motor regenerating operation is performed in the periods T2a and T2c in FIG. 10B. Similarly, although the motor regenerating operation is performed in the period T1b in FIG. 9B, the motor driving operation is performed in the period T2b in FIG. 10B.

As illustrated in the period T2a, in the off period (corresponding to the "H" level in this case) of the PWM signal PWMON_MODu, the voltage level of the drive output signal OUTu becomes "VM−IdxRon1". When the PWM signal PWMON_MODu shifts from the off period to the on period (corresponding to the "L" level in this case) in this state, the high-side on signal UON is negated to the "L" level. In response, the gate-source capacitance in the high-side transistor M1u is discharged, and the gate-source voltage Vgs decreases.

When the gate-source voltage Vgs of the high-side transistor M1u decreases to a certain degree, the regeneration current Ir from the motor starts flowing in the path including the body diode D1u and, accordingly, the voltage level of the drive output signal OUTu becomes "VM+Vf1" (Vf1 denotes forward voltage of the body diode D1u). When the gate-source voltage Vgs of the high-side transistor M1u decreases below the threshold voltage Vth, the high-side off detection signal UOFFDET is asserted to the "H" level and, in response, the low-side on signal LON is asserted to the "H" level.

As a result, in the low-side transistor M2u, the gate-source capacitance is charged so that the gate-source voltage Ygs rises and the current which can be drawn in the low-side transistor M2u increases. When the current which can be drawn in the low-side transistor M2u increases to a level that drive current can be passed to the motor, the motor regenerating operation shifts to the motor driving operation using the low-side transistor M2u. As a result, the drive output signal OUTu falls towards "GND−IdXRon2".

In the falling period, the source-drain voltage fluctuates (decreases) in the low-side transistor M2u, so that the gate-source voltage Vgs is maintained to be constant. When the falling of the drive output signal OUTu stops, the gate-source voltage Vgs of the low-side transistor M2u rises again toward the maximum voltage level (=VAL) and reaches the period T2b of the steady state.

In FIG. 10B, delay time from the time point when the PWM signal PWMON_MODu shifts from the off period ("H" level) to the on period ("L" level) to the time point when the high-side transistor M1u shifts from on to off (that is, UOFFDET is asserted) is expressed as tdU1. Delay time since the time point when the high-side transistor M1u shifts to off until the time point when the falling of the drive output signal OUTu starts in response to the transition from off to on of the low-side transistor M2u is expressed as tdL1.

Moreover, delay time since the time point when the falling of the drive output signal OUTu starts until the time point when the drive output signal OUTu decreases to the intermediate voltage Vm is expressed as tdO1. In this case, the PWM signal PWMON_MODu shifts from the off period to the on period, and then, the drive output signal OUTu falls after delay time tdA1 (=tdU1+tdL1+tdO1)

When the PWM signal PWMON_MODu shifts from the on period ("L" level) to the off period ("H" level), the low-side on signal LON is negated to the "L" level. In response, in the low-side transistor M2u, the gate-source capacitance is discharged and the gate-source voltage Vgs decreases. When the current which can be supplied in the low-side transistor M2u decreases to the drive current Id, the drive output signal OUTu rises and becomes higher than the power supply voltage, so that the regenerative current Ir from the motor starts flowing in the path using the body diode D1u. As a result, the voltage level of the drive output signal OUTu becomes "VM+Vf1".

In the rising period, in the low-side transistor M2u, since the source-drain voltage fluctuates (increases), the gate-source voltage Vgs is maintained almost constant. When the rising of the drive output signal OUTu stops, the gate-source voltage Vgs of the low-side transistor M2u decreases again toward 0V.

When the gate-source voltage Vgs of the low-side transistor M2u decreases below the threshold voltage Vth, the low-side off detection signal LOFFDET is asserted to the "H" level and, in response, the high-side on signal UON is asserted to the "H" level. As a result, the gate-source voltage Vgs of the high-side transistor M1u rises toward the maximum voltage level (almost equal to VAH−VM). When the high-side transistor M1u is turned on, the regenerative current Ir flows via the high-side transistor M1u. Consequently, as illustrated in the period T2c, the voltage level of the drive output signal OUTu becomes "VM+IrxRon1".

In FIG. 10B, delay time from the time point when the PWM signal PWMON_MODu shifts from the on period ("L" level) to the off period ("H" level) to the time point when the rising of the drive output signal OUTu starts is expressed as tdL2. Delay time since the time point when the rising of the drive output signal OUTu starts until the time point when the drive output signal OUTu rises to the intermediate voltage Vm is expressed as tdO2. In this case, the drive output signal OUTu rises after the delay time tdA2 (=tdL2+tdO2) since the PWM signal PWMON_MODu shifts from the on period to the off period.

As described above, in the case where the low-side transistor M2u performs a current sink operation, in the drive output signal OUTu, a falling delay of the delay time tdA1 occurs at the time of transition from the off period to the on period of the PWM signal PWMON_MODu, and a rise delay of the delay time tdA2 occurs at the time of transition from the on period to the off period. As understood from FIG. 10B, the delay time tdA1 is longer than the delay time tdA2.

Like the case of FIG. 9B, the reason is that, in the case of controlling the drive transistor (in this case, the low-side transistor M2u) from the off state to the on state, as a pre-process, a control of the regenerative transistor (in this case, the high-side transistor M1u) from the on state to the off state (that is, delay time tdU1 in FIG. 10B) becomes necessary. As a result, like the case of FIG. 9B, the actual on period (in this case, the "H" pulse width) in the drive output signal OUTu becomes shorter as compared with the on period (in this case, the "L" level) of the PWM signal PWMON_MODu. In other words, the duty of the drive output signal OUTu becomes smaller than the duty of the PWM signal PWMON_MODu.

Schematic Configuration and Schematic Operation [1] of PWM Corrector

As illustrated in FIGS. 9B and 10B, an error occurs between the duty of the PWM signal PWMON_MODu and the duty of the drive output signal OUTu. The difference between the rising/falling delay times (that is, |tdA2−tdA1|) as a cause of the error between the duties is usually constant. Consequently, by adding a correction based on the difference to the duty of the PWM signal PWMON_MODu, the error between the duties can be reduced.

Figure 11A:
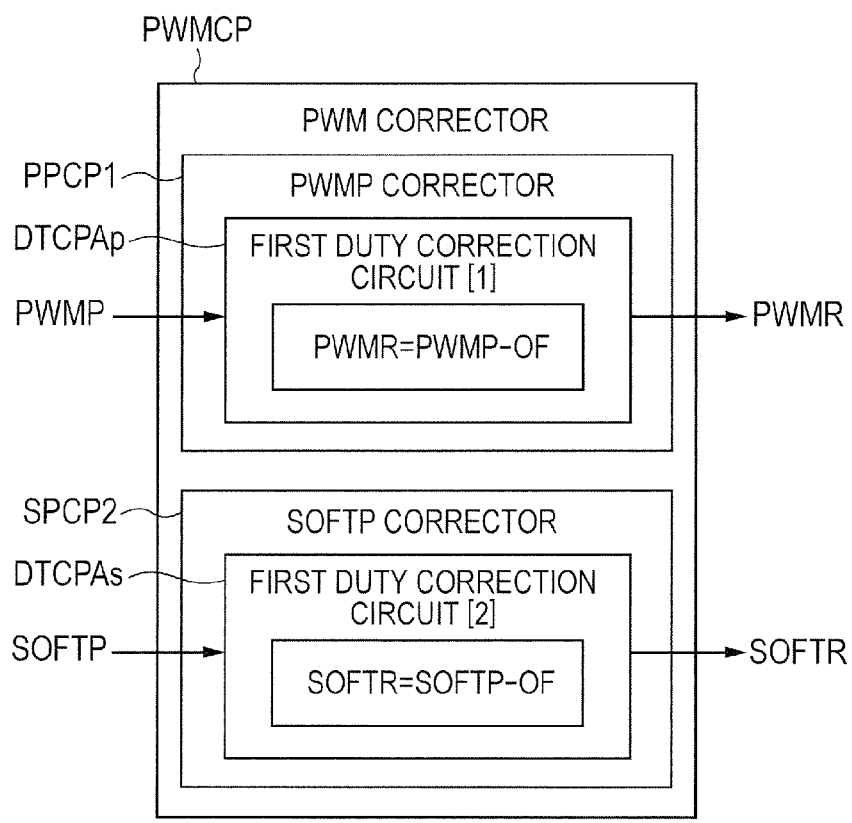
FIG. 11A is a conceptual diagram illustrating a schematic configuration example of a PWM corrector in FIG. 2.
Figure 11B:
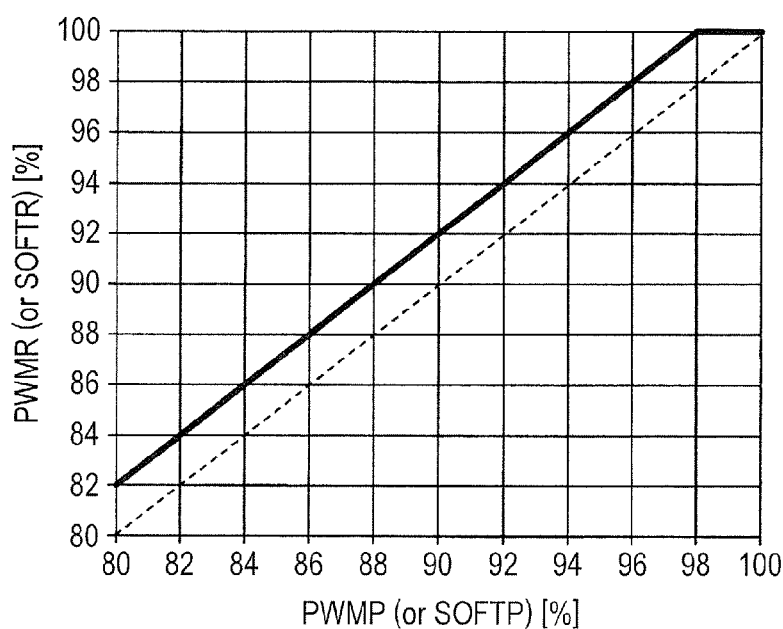
FIG. 11B is a diagram illustrating input/output characteristics of FIG. 11A.

FIG. 11A is a conceptual diagram illustrating a schematic configuration example of the PWM corrector PWMCP in FIG. 2, and FIG. 11B is a diagram illustrating an example of input/output characteristics of FIG. 11A. The PWM corrector PWMCP illustrated in FIG. 11A has a PWMP corrector PPCP1 and an SOFTP corrector SPCP1. The PWMP corrector PPCP1 has a first duty correction circuit [1] DTCPAp, and the SOFTP corrector SPCP1 also has a first duty correction circuit [2] DTCPAs.

The first duty correction circuit [1] DTCPAp receives a duty instruction value PWMP for a PWM pattern and generates a corrected duty instruction value (first corrected duty instruction value) PWMR for the PWM pattern in which an offset value OF that changes by the same increment as that of the duty instruction value PWMP and becomes a constant is reflected. Similarly, the first duty correction circuit [1] DTCPAs receives a duty instruction value SOFTP for a soft pattern and generates a corrected duty instruction value (first corrected duty instruction value) SOFTR for the soft pattern in which an offset value OF that changes by the same increment as that of the duty instruction value SOFTP and becomes a constant is reflected.

In the example of FIG. 11B, the first duty correction circuit [1] DTCPAp outputs the corrected duty instruction value PWMR by subtracting the offset value OF of −2% from the input duty instruction value PWMP. Similarly, the first duty correction circuit [2] DTCPAs also outputs the corrected duty instruction value SOFTR by subtracting the offset value OF of −2% from the input duty instruction value SOFTR. As described above, the duty instruction values PWMP and SOFTP and the corrected duty instruction values PWMR and SOFTP are values instructing length of the on period (that is, duty) of the PWM signal PWMON_MOD.

Figure 12A:
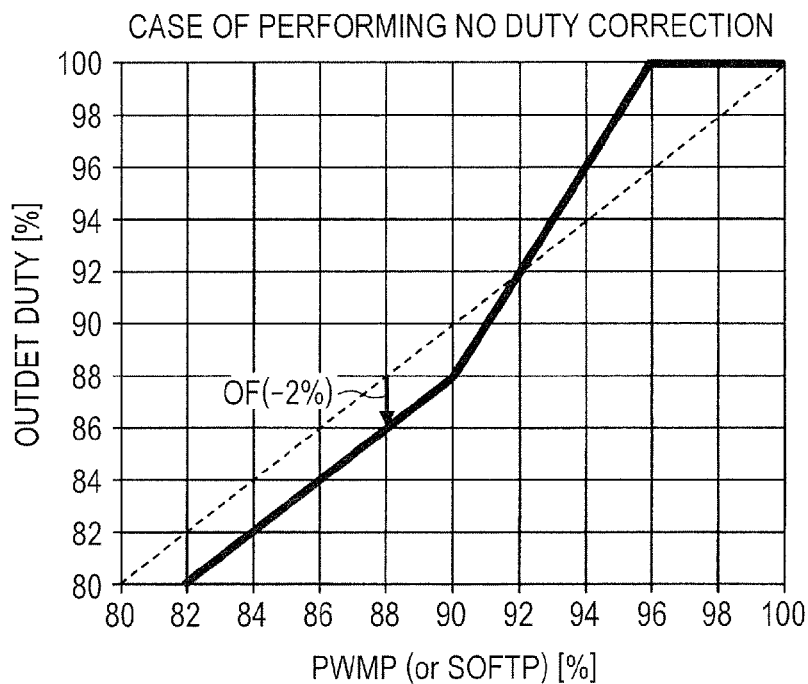
FIGS. 12A and 12B are diagrams illustrating characteristic examples of actual duties for duty instruction values.
Figure 12B:
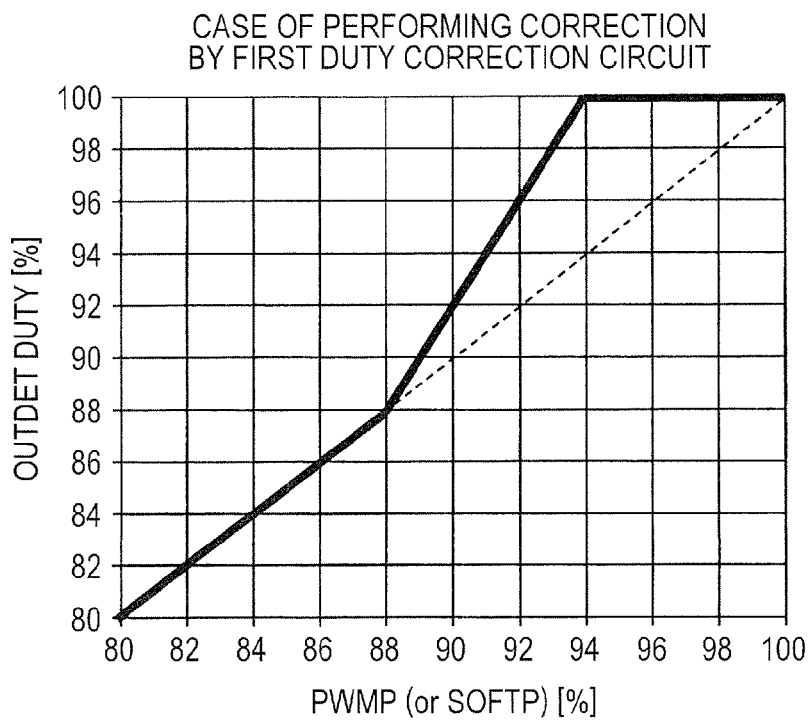

FIGS. 12A and 12B are diagrams illustrating a characteristic example of actual duties for the duty instruction values. FIG. 12A illustrates characteristics in the case where duty correction is not performed, and FIG. 12B illustrates characteristics in the case of performing a correction by using the first duty correction circuit of FIG. 11A. In other words, FIG. 12A expresses input/output characteristics of the SPM driver SPMDV (concretely, the circuit of FIG. 8). Although the duty instruction value for the PWM pattern will be described as an example hereinbelow, the duty instruction value for the soft pattern is also similar.

In FIG. 12A, when the duty instruction value PWMP is used as it is, the actual duty becomes smaller than the duty instruction value PWMP as illustrated in the range of PWMP≤90% as described with reference to FIGS. 9B and 10B. In the case of subtracting the duty instruction value PWMP from the actual duty, as illustrated in FIG. 12A, the offset value OF of −2% occurs. The actual duty denotes duty of the drive output signal OUT and corresponds to, for example, the duty of the output detection signal OUTDET illustrated in FIG. 8.

Therefore, the corrected duty instruction value PWMR as illustrated in FIG. 11B is used. With the value, the duty instruction value PWMP is set in the range of the duty instruction value PWMP≤88% as in FIG. 12B so that an actual duty and the duty instruction value PWMP can be made the same. As a concrete example, first, the first duty correction circuit [1] DTCPAp generates the corrected duty instruction value PWMR=90% by subtracting the offset value OF of −2% from the duty instruction value PWMP=88%.

The PWM signal generator PWMG generates the PWM signal PWMON_MOD based on the corrected duty instruction value PWMR=90%. On the other hand, as illustrated in FIG. 12A, the SPM driver SPMDV receives the PWM signal PWMON_MOD and generates the drive output signal OUT having the duty of 88%. As a result, the actual duty (88%) becomes equal to the duty instruction value PWMP (88%).

Problem of Schematic Configuration and Schematic Operation [1] of PWM Corrector

Figure 13:
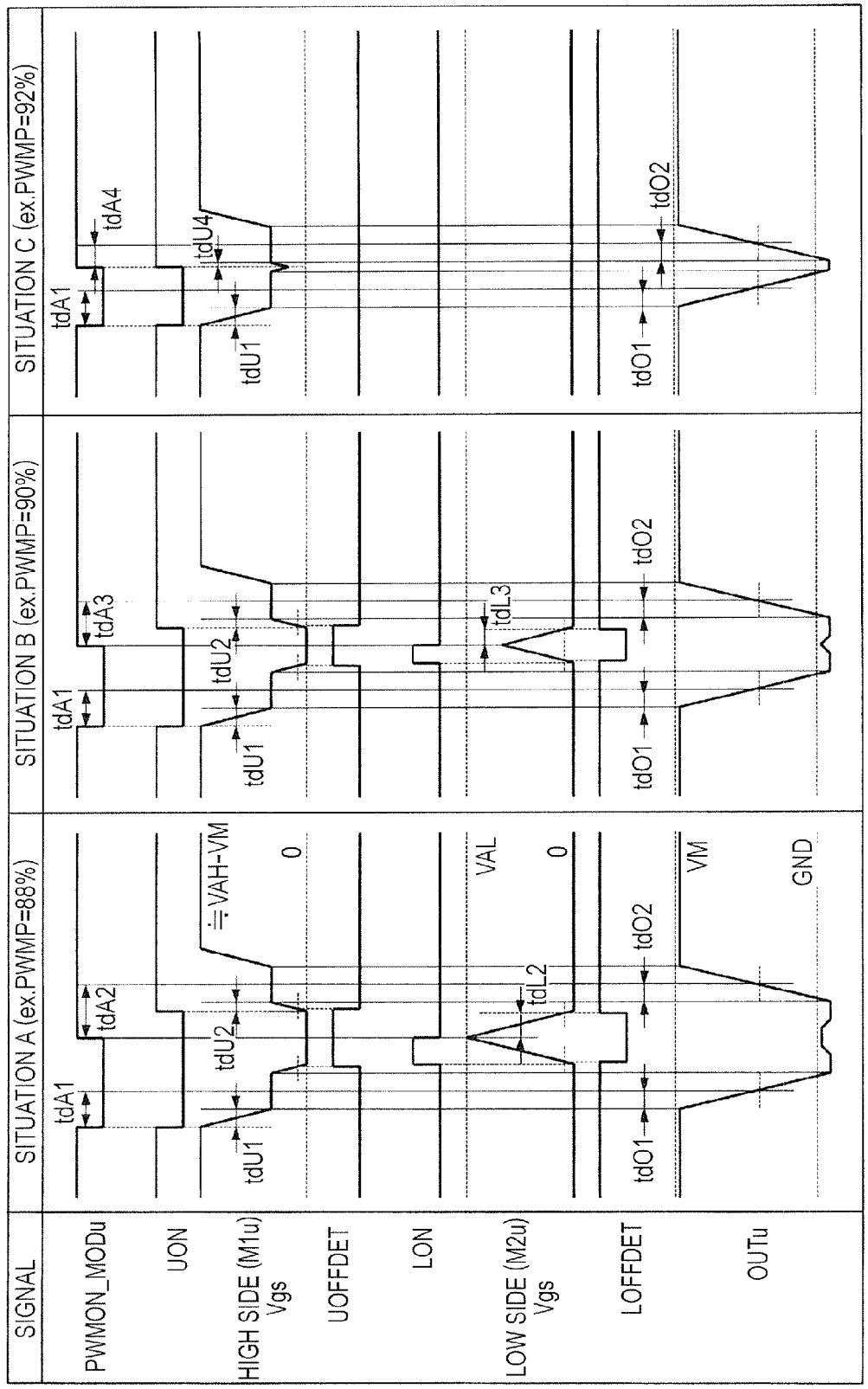
FIG. 13 is a diagram illustrating an example of a problem in the case of using the configuration of FIG. 11A.

As illustrated in FIG. 12B, in the range of PWMP>88%, even when the corrected duty instruction value PWMR of FIG. 11B is used, an error may occur between the actual duty and the duty instruction value PWMP. The cause will be described with reference to FIG. 13. FIG. 13 is a diagram illustrating an example of the problem in the case of using the PWM corrector in FIG. 11A and is a waveform chart illustrating situations in the case that the duty instruction value increases in FIG. 9B.

Situation A illustrated in FIG. 13 relates to, for example, the case of PWMP=88% (PWMR=90%) in FIG. 11B and illustrates the limit of a correction which can be made only by the first duty correction circuit [1] DTCPAp. In the situation A, the falling delay time tdA1 and the rising delay time tdA2 (=tdL2+tdU2+tdO2) are the same lengths as those in the case of FIG. 9B. Therefore, the correction can be made only by the first duty correction circuit [1] DTCPAp.

Situation B illustrated in FIG. 13 relates to the case where the duty instruction value PWMP increases and becomes, for example, PWMP=90% (PWMR=92%) and situation C relates to the case where the duty instruction value PWMP further increases and becomes, for example, PWMP=92% (PWMR=94%). First, in the situation B, as the duty instruction value PWMP increases, the gate-source voltage Vgs of the regenerative transistor (in this case, the low-side transistor M2u) does not reach the maximum voltage level (=VAL) different from the situation A (that is, the case of FIG. 9B).

Delay time tdL3 since the time point when the PWM signal PWMON_MODu shifts from the off period to the on period to the time point when the low-side transistor M2u shifts from on to off is shorter than the delay time tdL2 in the situation A. Accordingly, the rising delay time tdA3 (=tdL3+tdU2+tdO2) becomes shorter than that in the situation A only by "tdL2−tdL3".

The case that the duty instruction value PWMP increases only by ΔPWMP is assumed. First, in the case where duty instruction value PWMP is equal to or less than the duty instruction value (for example, 88%) corresponding to the situation A, when the duty instruction value PWMP increases only by ΔPWMP, the duty of the drive output signal OUT (the "H" period in this case) accordingly increases only by ΔPWMP.

On the other hand, in the case where the duty instruction value PWMP is around the duty instruction value (for example, 90%) corresponding to the situation B, when the duty instruction value PWMP increases only by ΔPWMP, the duty of the drive output signal OUT also increases only by ΔPWMP and, moreover, the rising delay time tdA3 becomes shorter only by time corresponding to ΔPWMP. When the rising delay time tdA3 becomes shorter, the duty of the drive output signal OUT shifts to an increase direction. As a result, as illustrated in FIG. 12B, when the duty instruction value PWMP increases only by ΔPWMP, the duty of the drive output signal OUT increases by an increment larger than ΔPWMP.

In the situation C, different from the situation B, with further increase of the duty instruction value PWMP, the gate-source voltage Vgs of the drive transistor (in this case, M1u) does not decrease to the threshold voltage Vth. As a result, in the situation C, delay time tdU4 shorter than the delay time tdU2 in the situation B occurs. Further, since the gate-source voltage Vgs of the drive transistor does not decrease to the threshold voltage Vth, different from the situation B, the on-off operation (that is, delay time tdL3) itself of the regenerative transistor (in this case, M2u) is not performed.

As a result, the rising delay time tdA4 (=tdU4+tdO2) in the situation C becomes shorter than the rising delay time tdA3 (=tdL3+tdU2+tdO2) in the situation B. When the rising delay time tdA4 becomes shorter, like the situation B, as the duty instruction value PWMP increases only by ΔPWMP, the duty of the drive output signal OUT increases by an increment larger than ΔPWMP.

In a process from the situation A to the situation B, with increase in the duty instruction value PWMP, discharge time (tdL2) of the gate-source capacitance of the regenerative transistor (M2u) becomes shorter. In a process from the situation B to the situation C, with increase in the duty instruction value PWMP, discharge time (tdL3) of the gate-source capacitance of the regenerative transistor (M2u) becomes shorter and, after that, charge time (tdU2) of the gate-source capacitance of the drive transistor (M1u) becomes shorter.

Therefore, for example, in the case of configuring the pre-driver PDV in FIG. 8 so that all of the charge/discharge times of the drive transistor and the regenerative transistor become equal, the duty of the drive output signal OUT changes linearly with respect to the change in the duty instruction value. In the example of FIG. 12B, when the duty instruction value PWMP increases only by ΔPWMP, the duty of the drive output signal OUT increases with an increment of "2×ΔPWMP".

As described above, in the situations B and C, since the duty of the drive output signal OUT increases with an increment larger than the increment of the duty instruction value PWMP, it is difficult to make a high-precision correction only by the first duty correction circuit [1] DTCPAp. Although the operation at the time of current source in FIG. 9B has been described in FIG. 13, the operation at the time of current sink in FIG. 10B is similar to the above. That is, accompanying the case such that on/off of the regenerative transistor (in this case, M1u) becomes insufficient, the delay time tdA1 becomes shorter. As a result, the duty of the drive output signal OUT increases with an increment larger than the increment of the duty instruction value PWMP.

Schematic Configuration and Schematic Operation [2] of PWM Corrector

Figure 14B:
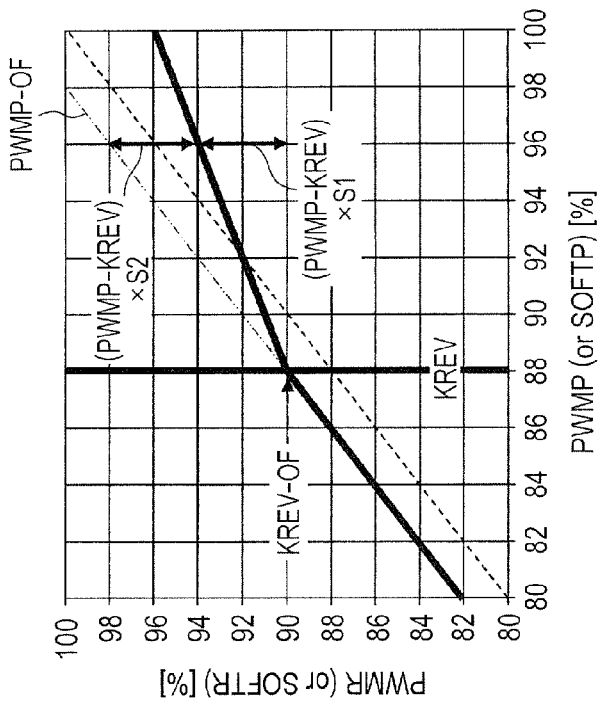
FIG. 14B is a diagram illustrating an example of input/output characteristics of FIG. 14A.
Figure 14A:
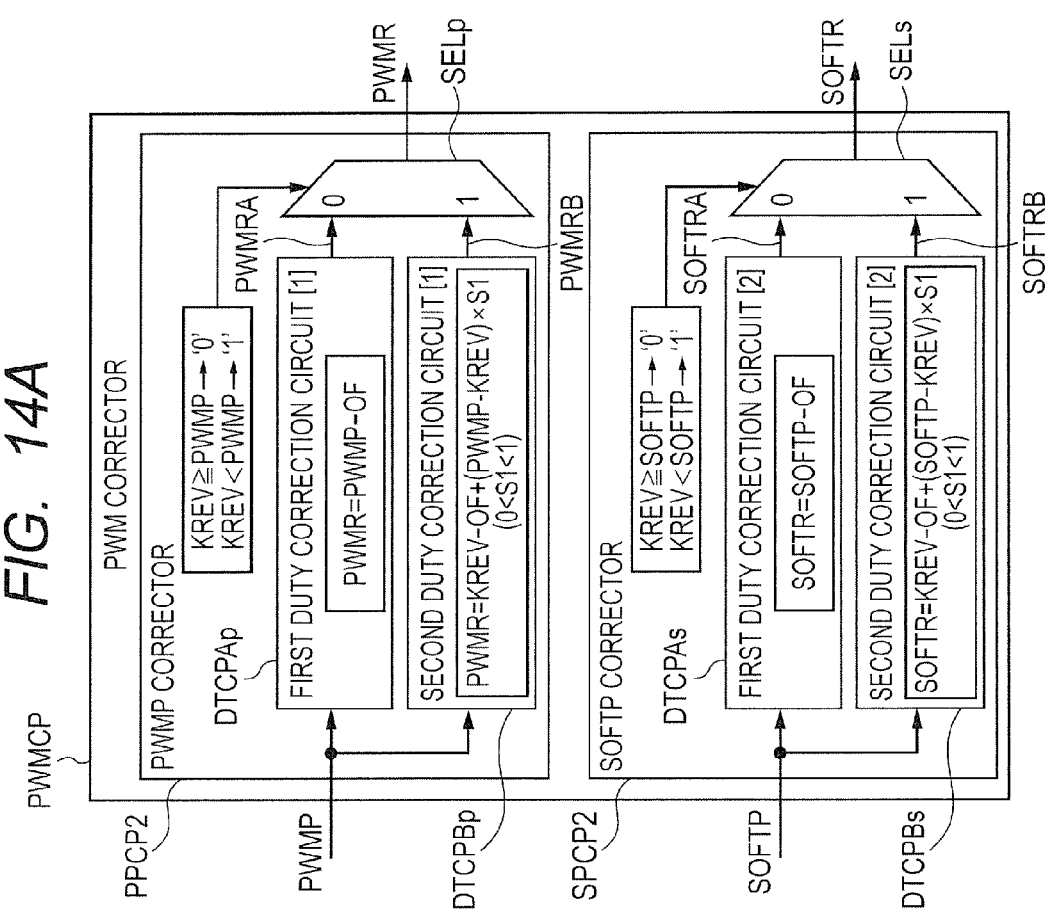
FIG. 14A is a conceptual diagram illustrating another schematic configuration example of the PWM corrector in FIG. 2.

FIG. 14A is a conceptual diagram illustrating a schematic configuration example of the PWM corrector PWMCP in FIG. 2, and FIG. 14B is a diagram illustrating an example of input/output characteristics of FIG. 14A. The PWM corrector PWMCP illustrated in FIG. 14A has a PWMP corrector PPCP2 and an SOFTP corrector SPCP2. The PWMP corrector PPCP2 has, in addition to the first duty correction circuit [1] DTCPAp illustrated in FIG. 11A, a second duty correction circuit [1] DTCPBp and a selector SELp. Similarly, the SOFTP corrector SPCP2 has, in addition to the first duty correction circuit [2] DTCPAs illustrated in FIG. 11A, a second duty correction circuit [2] DTCPBs and a selector SELs.

The first duty correction circuit [1] DTCPAp generates a first corrected duty instruction value PWMRA on the basis of the input/output characteristics illustrated in FIG. 11B. The second duty correction circuit [1] DTCPBp receives a duty instruction value PWMP for the PWM pattern and generates a corrected duty instruction value (second corrected duty instruction value) PWMPB which changes by an increment different from the increment of the duty instruction value PWMP. The selector SELp outputs, as the corrected duty instruction value PWMR for the PWM pattern, any one of the first corrected duty instruction value PWMRA and the second corrected duty instruction value PWMRB in accordance with the magnitude relation of the duty instruction value PWMP and the duty reference value KREV.

Specifically, the selector SELp outputs the first corrected duty instruction value PWMRA when the duty instruction value PWMP is smaller than the duty reference value KREV and outputs the second corrected duty instruction value PWMRB when the duty instruction value PWMP is larger than the duty reference value KREV. At this time, the second duty correction circuit [1] DTCPBp computes, for example, "(PWMP−KREV)×S" using sensitivity coefficient as S (0<S<1), thereby generating the second corrected duty instruction value PWMRB which changes with an increment smaller than the increment of the duty instruction value PWMP. As illustrated in the situation A in FIG. 13, the duty reference value KREV expresses the upper limit value of the duty instruction value PWMP which can be corrected by the first duty correction circuit [1] DTCPAp.

The first duty correction circuit [2] DTCPAs generates a first corrected duty instruction value SOFTRA on the basis of the input/output characteristics illustrated in FIG. 11B. A second duty correction circuit [2] DTCPBs receives the duty instruction value SOFTP for a soft pattern and generates a corrected duty instruction value (second corrected duty instruction value) SOFTRB which changes with an increment different from the increment of the duty instruction value SOFTP. The selector SELs outputs, as the corrected duty instruction value SOFTR for the soft pattern, any one of the first corrected duty instruction value SOFTRA and the second corrected duty instruction value SOFTRB in accordance with the magnitude relation of the duty instruction value SOFTP and the duty reference value KREV.

The PWMP corrector PPCP2 and the SOFTP corrector SPCP2 perform similar operations using similar configurations except for the point that a duty instruction value and a corrected duty instruction value as input and output are for the PWM pattern or the Soft pattern. Therefore, hereinbelow, the details will be described using the PWMP corrector PPCP2 as a representative.

FIG. 14B illustrates an example of input/output characteristics using the duty instruction value PWMP as an input and the corrected duty instruction value PWMR as an output as the case where the duty reference value KREV is 88% as an example. In the case where the duty instruction value PWMP is smaller than the duty reference value KREV (88%), as illustrated in FIG. 11B, the PWMP corrector PPCP2 outputs, as the corrected duty instruction value PWMR, the first corrected duty instruction value PWMRA obtained by subtracting the offset value OF (in this case, 2%) from the duty instruction value PWMP.

On the other hand, when the duty instruction value PWMP is larger than the duty reference value KREV (88%), the PWMP corrector PPCP2 outputs, as the corrected duty instruction value PWMR, the second corrected duty instruction value PWMRB which changes with an increment that is S1 (0<S1<1) time (in this case, ½ time) of the increment "PWMP−KREV" of the duty instruction value PWMP. For example, in the example of FIG. 12B, within the range of PWMP≥88%, the duty of the drive output signal OUT changes with an increment which is J times (in this case, twice) of the increment "PWMP−KREV" of the duty instruction value PWMP.

In response, in the example of FIG. 14B, the corrected duty instruction value PWMR is changed with an increment of S1 (=1/J) time (in this case, ½ time) of the increment "PWMP−KREV" of the duty instruction value PWMP within the range of PWMP≥88%. In this case, the increment "PWMP−KREV" of the input is corrected to the increment of (1/J) time, and J times becomes the increment of the output. Consequently, the increment of the input (that is, the duty instruction value PWMP) and the increment of the output (that is, the duty of the drive output signal OUT) become equal to each other. Also in the range of PWMP≥88%, the duty of the drive output signal OUT becomes equal to the duty instruction value PWMP.

More specifically, the input/output characteristic of FIG. 14B is a characteristic based on the inverse function (function of x=y symmetry) of the input/output characteristic of FIG. 12A. For example, when an input duty of 80% to 100% is input to the SPM driver SPMDV, the actual duty is determined on the basis of a predetermined transfer function expressing the characteristic of FIG. 12A. On the other hand, when its inverse function is used, an input duty necessary to determine the actual duty to 80% to 100% can be calculated. Therefore, when the corrected duty instruction value PWMR generated for the duty instruction value PWMP of 80% to 100% is determined for the input duty calculated by the inverse function, the actual duty also similarly becomes 80% to 100% for the duty instruction value PWMP of 80% to 100%.

To realize the input/output characteristic illustrated in FIG. 14B, specifically, the second duty correction circuit [1] DTCPBp generates a second corrected duty instruction value by computation using the value of "(PWMP−KREV)× S" (0<S<1) and the offset value OF. There are some more-specific computing methods. Representative methods include, as understood from FIG. 14B, a method of computing "PWMR=KREV−OF+(PWMP−KREV)×S1" by using sensitive coefficient S1 and a method of computing "PWMR=PWMP−OF−(PWMP−KREV)×S2" by using sensitive coefficient S2.

Figure 15:
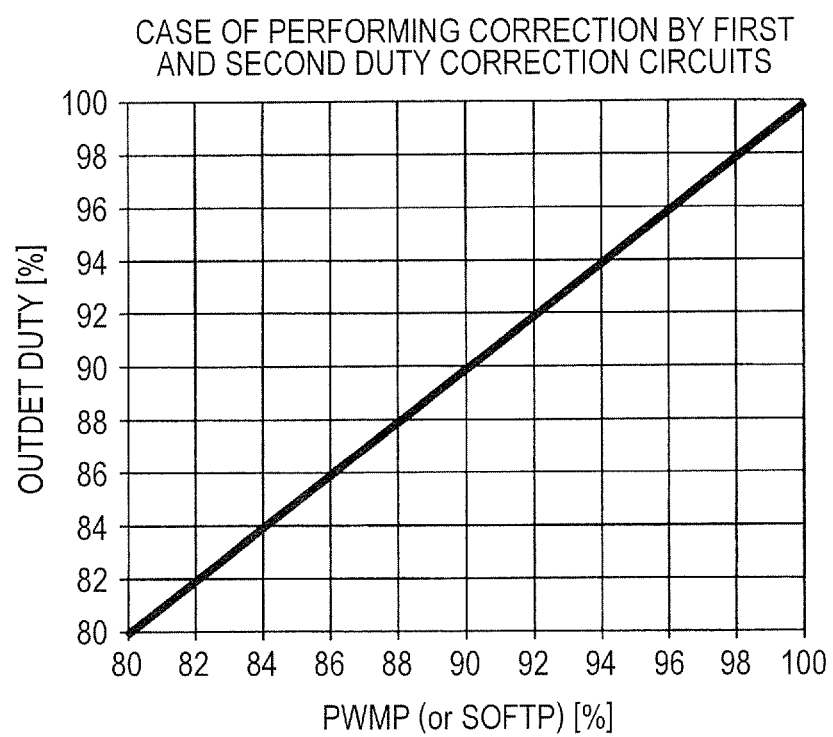
FIG. 15 is a diagram illustrating a characteristic example of actual duties for duty instruction values in the case of using the input/output characteristics of FIG. 14B.

Major Effects of Schematic Configuration and Schematic Operation [2] of PWM Corrector FIG. 15 is a diagram illustrating a characteristic example of an actual duty (duty of the drive output signal) for the duty instruction value in the case of using the input/output characteristic of FIG. 14B. By using the input/output characteristic of FIG. 14B, as illustrated in FIG. 15, in addition to the range of the duty instruction value PWMP≤88%, also in the range of the duty instruction value PWMP>88%, the actual duty can be made equal to the duty instruction value PWMP.

For example, in FIG. 14B, in the case of the duty instruction value PWMP=92%, the corrected duty instruction value PWMR is equal to 92%. When the SPM driver SPMDV is controlled with the PWM signal PWMON_MOD of the corrected duty instruction value PWMR=92%, as illustrated in FIG. 12A, the actual duty (duty of the drive output signal OUT) becomes 92% which is the same as that of the duty instruction value PWMP. In FIG. 14B, in the case of the duty instruction value PWMP=96%, the corrected duty instruction value PWMP becomes 94%. When the SPM driver SPMDV is controlled with the PWM signal PWMON_MOD of the corrected duty instruction value PWMR=94%, as illustrated in FIG. 12A, the actual duty becomes 96% which is the same as that of the duty instruction value PWMP.

With the above, the motor can be actually driven by using a duty in which the duty instruction value PWMP is reflected with high precision, drive current (sinusoidal current) with little distortion can be passed to the motor, so that torque ripples can be reduced. As a result, noise and vibration of the motor can be reduced. Further, as described with reference to FIG. 1, positioning precision of the magnetic head HD can be increased.

Detailed Configuration and Operation of PWM Corrector

Figure 16:
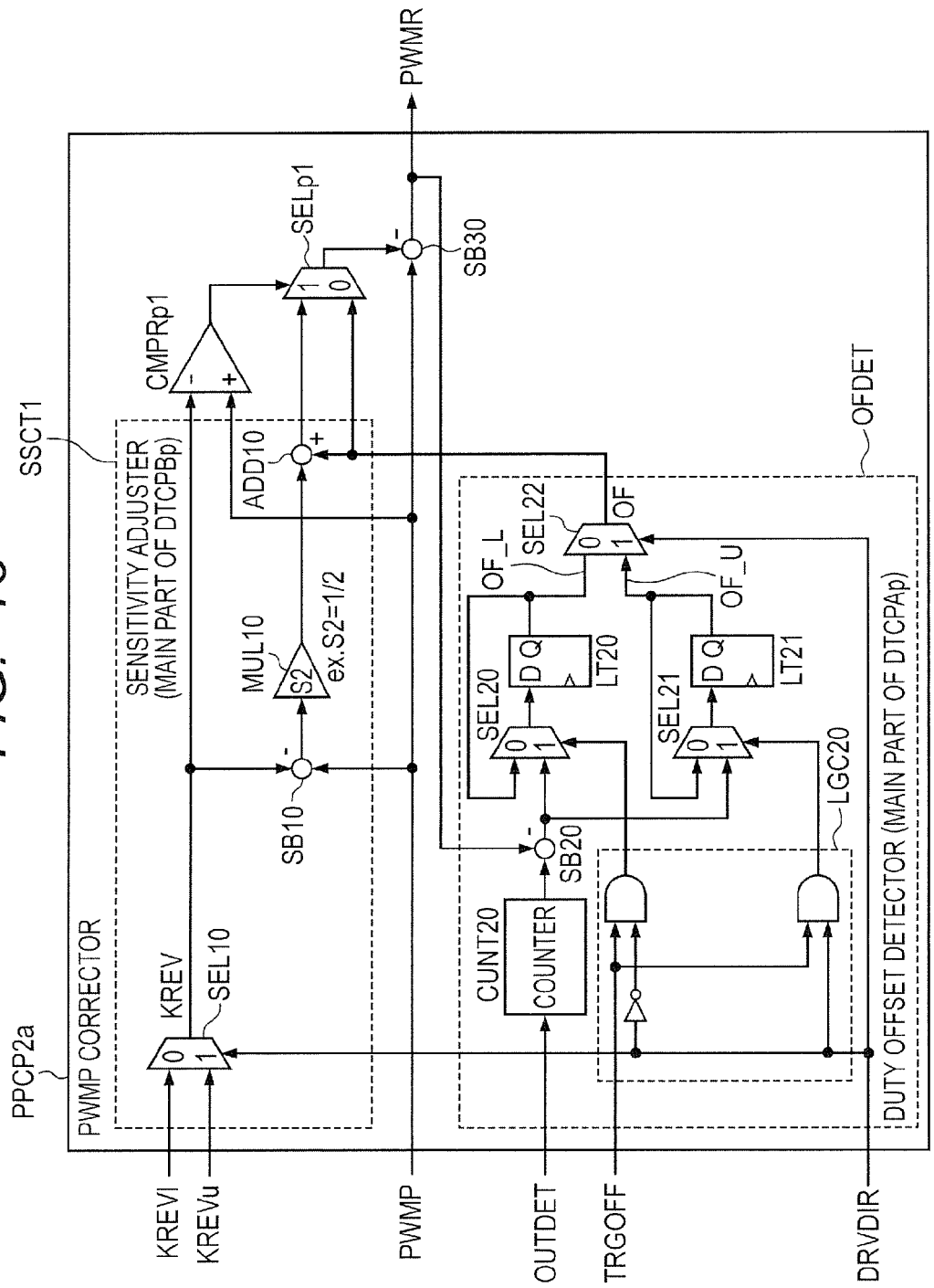
FIG. 16 is a circuit block diagram illustrating a detailed configuration example of a PWMP corrector in FIG. 14A.

FIG. 16 is a circuit block diagram illustrating a detailed configuration example of the PWMP corrector PPCP2 in FIG. 14A. Although the PWMP corrector PPCP2 will be described as an example, the SOFTP corrector SPCP2 is similar. The PWMP corrector PPCP2a illustrated in FIG. 16 has a duty offset detector OFDET, a sensitivity adjuster SSCT1, a comparator CMPRp1, a selector SELp1, and a subtracter (error corrector) SB30. The PWMP corrector PPCP2a can be configured by a method of providing dedicated hardware, a method of making a processor execute a software process, and a method of combining dedicated hardware and a software process.

The duty offset detector OFDET is a main part of the first duty correction circuit [1] DTCPAp in FIG. 14A and the sensitivity adjuster SSCT1 is a main part of the second duty correction circuit [2] DTCPBp. The comparator CMPRp1 and the selector SELp1 correspond to the selector SELp in FIG. 14A. Since the duty offset detector OFDET and the sensitive adjuster SSCT1 make a correction via the common subtracter (error corrector) SB30 in this case, strictly, the configuration is slightly different from that of FIG. 14A. However, it is conceptually the same as the configuration of FIG. 14A.

The duty offset detector OFDET has a counter CUNT20, selectors SEL20 to SEL22, latch circuits LT20 and LT21, a subtracter SB20, and a control logic circuit LGC20. The selector SEL21 outputs, as the offset value OF, an offset value OF_U for the source when the drive direction instruction DRVDIR is at the "H" level (corresponding to the current source) and outputs an offset value OF_L for sink when the drive direction instruction signal DRVDIR is at the "L" level (corresponding to current sink). As illustrated in FIG. 2, the drive direction instruction signal DRVDIR is output from the PWM signal generator PWMG determining the current source and the current sink.

The PWM signal generator PWMG also outputs a trigger signal TRGOFF for determining the offset value OF_U for the source and the offset value OF_L for the sink. Concretely, the subtracter 20 calculates an error by subtracting the corrected duty instruction value PWMR from the actual duty. The actual duty is measured by counting the pulse width of the output detection signal OUTDET illustrated in FIG. 8 by using a reference clock of digital control by the counter CUNT20 in FIG. 16.

In the case where the trigger signal TRGOFF is at the "H" level and the drive direction instruction signal DRVDIR is at the "H" level (current source), a fetch path side ("1" side) is selected via the control logic circuit LGC20. In this case, the error detected by the subtracter SB20 is fetched by the latch circuit LT21 via the selector SEL21, and the offset value OF_U for the source is determined by the output of the latch circuit LT21. When each of the trigger signal TRGOFF and the drive direction instruction signal DRVDIR is not at the "H" level, the latch path side ("0" side) of the selector SEL21 is selected via the control logic circuit LGC20. In this case, an output of the latch circuit LT21 is maintained via the selector SEL21.

On the other hand, in the case where the trigger signal TRGOFF is at the "H" level and the drive direction instruction signal DRVDIR is at the "L" level (current sink), the fetch path side ("1" side) of the selector SEL20 is selected via the control logic circuit LGC20. In this case, the error detected by the subtracter SB20 is fetched by the latch circuit LT20 via the selector SEL20, and the offset value OF_L for the sink is determined by the output of the latch circuit LT20. When the trigger signal TRGOFF and the drive direction instruction signal DRVDIR are not at the "H" level and the "L" level, respectively, the latch path side ("0" side) of the selector SEL20 is selected via the control logic circuit LGC20. In this case, an output of the latch circuit LT20 is maintained via the selector SEL20.

The sensitivity adjuster SSCT1 has a selector L10, a subtracter SB10, a multiplier MUL10, and an adder ADD10. When the drive direction instruction signal DRVDIR is at the "H" level (current source), the selector SEL10 outputs a duty reference value (first duty reference value) KREu for the source as the duty reference value KREV. On the other hand, when the drive direction instruction signal DRVDIR is at the "L" level (current sink), the duty reference value for the sink (the second duty reference value) KREV1 is output as the duty reference value KREV. Each of the duty reference values (KREVu and KREV1) is arbitrary determined by, for example, performing simulation in advance and preliminarily set as a PWM correction parameter KREVxx in the parameter setting register REG in FIG. 2.

The subtracter SB10 subtracts the duty reference value KREV from the duty instruction value PWMP and the multiplier MUL10 multiplies the subtraction result "PWMP−KREV" by S2 (for example, S2=1/2) time. The adder ADD10 adds the offset value OF from the duty offset detector OFDET to the multiplication result "(PWMP−KREV)×S2".

The comparator CMPRp1 compares a magnitude relation between the duty instruction value PWMP and the duty reference value KREV. In accordance with the magnitude relation, the selector SELp1 outputs the offset value OF from the duty offset detector OFDET in the case where PWMP−KREV and outputs "(PWMP−KREV)×S2+OF" from the adder ADD10 of the sensitivity adjuster SSCT1 in the case where PWMP>KREV.

The subtracter (error corrector) SB30 subtracts the output of the selector SELp1 from the duty instruction value PWMP, thereby outputting the corrected duty instruction value PWMR. As a result, in the case where the corrected duty instruction value PWMR satisfies PWMPKREV, "PWMP−OF" is resulted. In the case where PUMP>KREV, as described with reference to FIG. 14B, "PWMP−OF−(PWMP−KREV)×S2" is resulted.

As described above, in the configuration of FIG. 16, the offset value OF_U for the source, the offset value OF_L for the sink, the duty reference value KREVu for the source, and the duty reference value KREV1 for the sink are provided. The offset value OF_U for the source and the duty reference value KREVu for the source are used in the case of performing the operations illustrated in FIGS. 9A and 9B, and the offset value OF_L for the sink and the duty reference value KREV1 for the sink are used in the case of performing the operations illustrated in FIGS. 10A and 10B.

As illustrated in FIGS. 9B and 10B, the operation at the time of the current source and the operation at the time of the current sink are slightly different from each other. Consequently, it is feared that the offset value and the duty reference value are slightly different. Therefore, in FIG. 16, two kinds of offset values (OF_L and OF_U) and two kinds of duty reference values (KREVu and KREV1) are provided. With the configuration, the duty instruction value PWMP and the actual duty (duty of the drive output signal OUT) can be matched at higher precision.

Since the offset value is determined on the basis of an actual measurement result, also by it, the duty instruction value PWMP and the actual duty can be matched at higher precision. The PWM signal generator PWMG controls the trigger signal TRGOFF to the "H" level at the time of, for example, activation of the HDD device or the like and controls the trigger signal TRGOFF to the "L" level in normal operation after the activation. In this case, the duty offset detector OFDET determines an offset value at the time of activation or the like and, in the normal operation, maintains the determined offset value.

The polarities of subtracters and adders illustrated in FIG. 16 are not limited to those in FIG. 16 but can be properly changed. For example, in the case where the subtracter SB20 subtracts the output of the counter CUNT20 from the corrected duty instruction value PWMR, the polarity of each of the subtracters and the adders can be properly changed. In FIG. 16, the configuration of performing the computation of "PWMR=PWMP−OF−(PWMP−KREV)×S2" is employed. As described with reference to FIG. 14B and the like, a configuration of performing computation of "PWMR=KREV−OF+(PWMP−KREV)×S1" may be employed. Further, the sensitivity coefficient S2 of the multiplier MUL may be properly determined according to the configuration of the SPM driver SPMDV (that is, the characteristic of FIG. 12B) and, in some cases, can be arbitrarily set by the parameter setting register REG in FIG. 2.

From the above, by using the method of the first embodiment, representatively, noise and vibration of the motor can be reduced.

Second Embodiment

Detailed Configuration and Operation of PWM Corrector (Modification [1])

Figure 17:
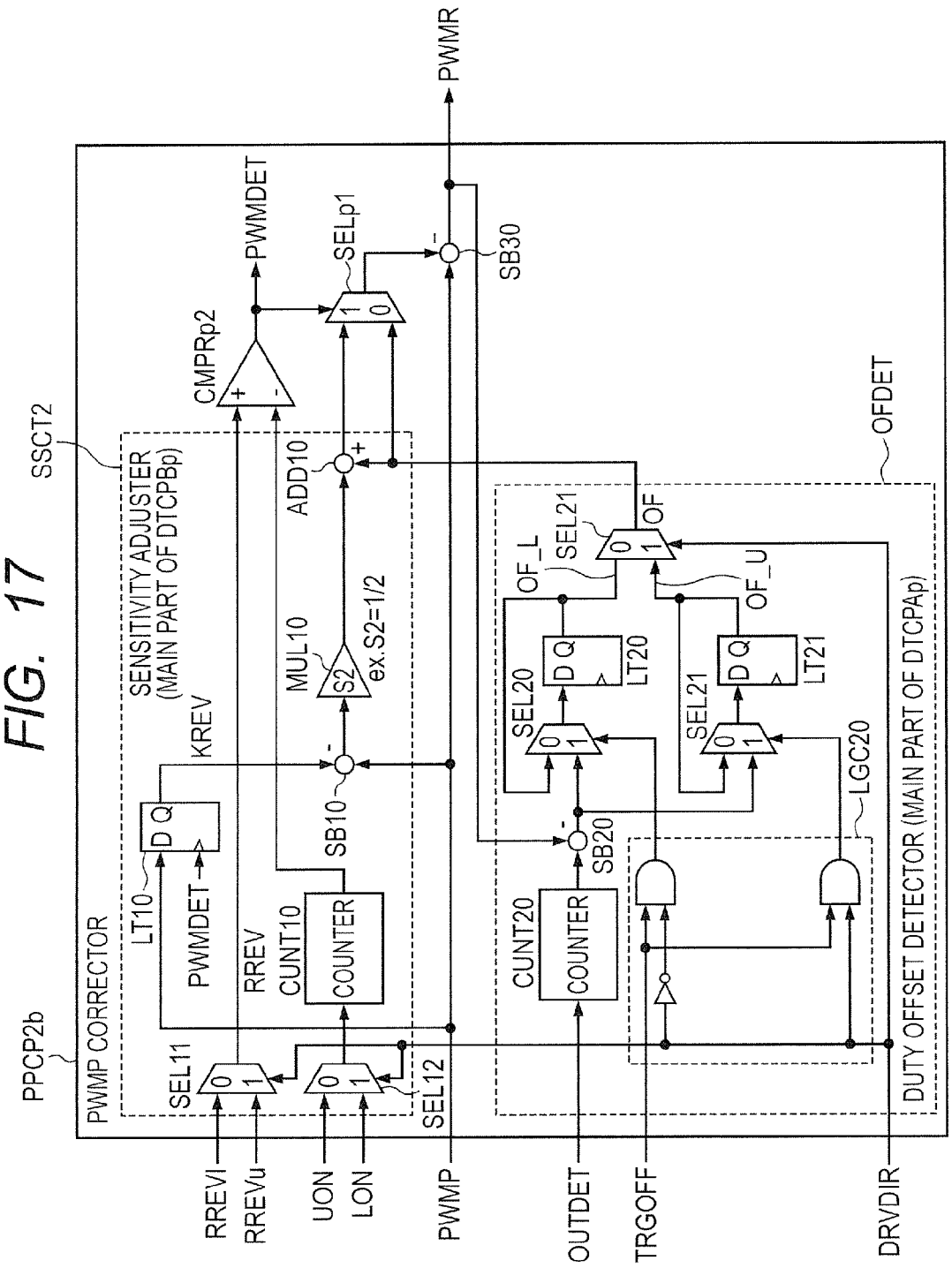
FIG. 17 is a circuit block diagram illustrating a detailed configuration example of the PWMP corrector in a motor driving device according to a second embodiment of the present invention.

FIG. 17 is a circuit block diagram illustrating a detailed configuration example of a PWMP corrector in a motor driving device according to a second embodiment of the present invention. The PWMP corrector PPCP2b illustrated in FIG. 17 is similar to the PWMP corrector PPCP2a of FIG. 16 except for a point that the configuration of a sensitivity adjuster SSCT2 is different and a point that an input of a comparator CMPRp2 is different.

The sensitivity adjuster SSCT2 in FIG. 17 has, in addition to the subtracter SB10, the multiplier MUL10, and the adder ADD10 illustrated in FIG. 16, selectors SEL11 and SEL12, a counter CUNT10, and a latch circuit LT10.

The PWMP corrector PPCP2b illustrated in FIG. 17 has conceptually a configuration that the duty reference value KREV in the PWMP corrector PPCP2 illustrated in FIG. 14A is determined on the basis of an actual measurement result. Outline is described as follows. The duty reference value KREV is determined by monitoring the on period of the regenerative transistor, and is determined to the duty instruction value PWMP at the time point when the on period becomes shorter than a predetermined period.

Concretely, first, the selector SEL12 outputs the low-side on signal LON illustrated in FIG. 9B and the like when the drive direction instruction signal DRVDIR is at the "H" level (current source), and outputs the high-side on signal UON illustrated in FIG. 10B or the like when the drive direction instruction signal DRVDIR is at the "L" level (current sink). The counter CUNT10 counts the "H" period (assert period) of the signal output from the selector SEL12 by reference clocks of digital control.

On the other hand, the selector SEL11 outputs a determination reference value RREV for the count value from the counter CUNT10. The selector SEL11 outputs, as the determination reference value RREV, a determination reference value RREVu for source when the drive direction instruction signal DRVDIR is at the "H" level (current source) and outputs a duty reference value RREV1 for sink when the drive direction instruction signal DRVDIR is at the "L" level (current sink). Each of the determination reference values (RREVu and RREV1) is arbitrarily determined by, for example, the parameter setting register REG in FIG. 2.

When the count value from the counter CUNT10 becomes smaller than the determination reference value RREV, the comparator CMPRp2 makes the detection signal PWMDET shift from the "L" level to the "H" level. The latch circuit LT10 latches the duty instruction value PWMP using the shift of the detection signal PWMDET to "H" as a trigger and outputs the duty reference value KREV. The duty reference value KREV is determined as a value (first duty reference value) based on a result of comparison between the low-side on signal LON and the determination reference value RREVu at the current source time and determined as a value (second duty reference value) based on a result of comparison between the high-side on signal UON and the determination reference value RREV1 for sink at the time of current sink.

The subtracter SB10 subtracts the duty reference value KREV from the latch circuit LT10 from the duty instruction value PWMP. In the case where an output from the comparator CMPRp2 is at the "H" level, the selector SELp1 selects an output from the adder ADD10 in the sensitivity adjuster SSCT2. In the case where the output from the comparator CMPRp2 is at the "L" level, the selector SELp1 selects the offset value OF from the duty offset detector OFDET.

As understood from FIG. 13, necessity of switching between the first duty correction circuit [1] DTCPAp and the second duty correction circuit [1] DTCPBp can be determined by whether the on period of the regenerative transistor becomes shorter than a predetermined period or not. The on period of the regenerative transistor becomes the assert period of the low-side on signal LON at the time of current source and becomes the assert period of the high-side on signal UON at the time of current sink.

The comparator CMPRp2 monitors the on period of the regenerative transistor (that is, an output of the counter CUNT10) and holds, as the duty reference value KREV, the duty instruction value PWMP at the time point when the on period becomes shorter than the period of the determination reference value RREV in the latch circuit LT10. For example, when the case that the duty instruction value PWMP increases is assumed, at some time point, the on period of the regenerative transistor becomes shorter than the period of the determination reference value RREV, and the duty instruction value PWMP at that time point is held as the duty reference value KREV in the latch circuit LT10.

The comparator CMPRp2 makes the selector SELp1 select the second duty correction circuit DTCPBp side at the same timing as the timing when the duty reference value KREV is held. With further increase in the duty instruction value PWMP, as long as the on period of the regenerative transistor is shorter than the period of the termination reference value RREV, the comparator CMPRp2 makes the selector SELp1 select the second duty correction circuit DTCPBp side. In this state, in other words, in the case where PWMP>KREV, the selector SELp1 selects the second duty correction circuit DTCPBp side.

On the other hand, for example, when the duty instruction value PWMP is in the decrease direction and the on period of the regenerative transistor becomes longer than the period of the determination reference value RREV, the comparator CMPRp2 makes the selector SELp1 select the first duty correction circuit DTCPAp side. The duty instruction value PWMP at the time point when the on period of the regenerative transistor becomes longer than the period of the determination reference value RREV becomes equal to the duty reference value KREV held in the latch circuit LT10. Therefore, in the state, in other words, when PWM23 KREV, the selector SELp1 selects the first duty correction circuit DTCPAp side.

By using the method of the second embodiment, in some cases, noise and vibration of the motor can be further reduced as compared with the method of the first embodiment. Specifically, in the method of the first embodiment, the duty reference value KREV is a predetermined constant. Consequently, when variations occur in characteristics of the transistors by temperatures, manufacturing processes, and the like, the correction precision may be deteriorated. On the other hand, in the method of the second embodiment, the duty reference value KREV is a variable which is determined by actually measuring the on period of the regenerative transistor, so that correction precision may be improved as compared with the method of the first embodiment. From the viewpoint of the circuit area or the like, the method of the first embodiment is more advantageous.

Third Embodiment

Detailed Configuration and Operation of PWM Corrector (Modification [2])

Figure 18:
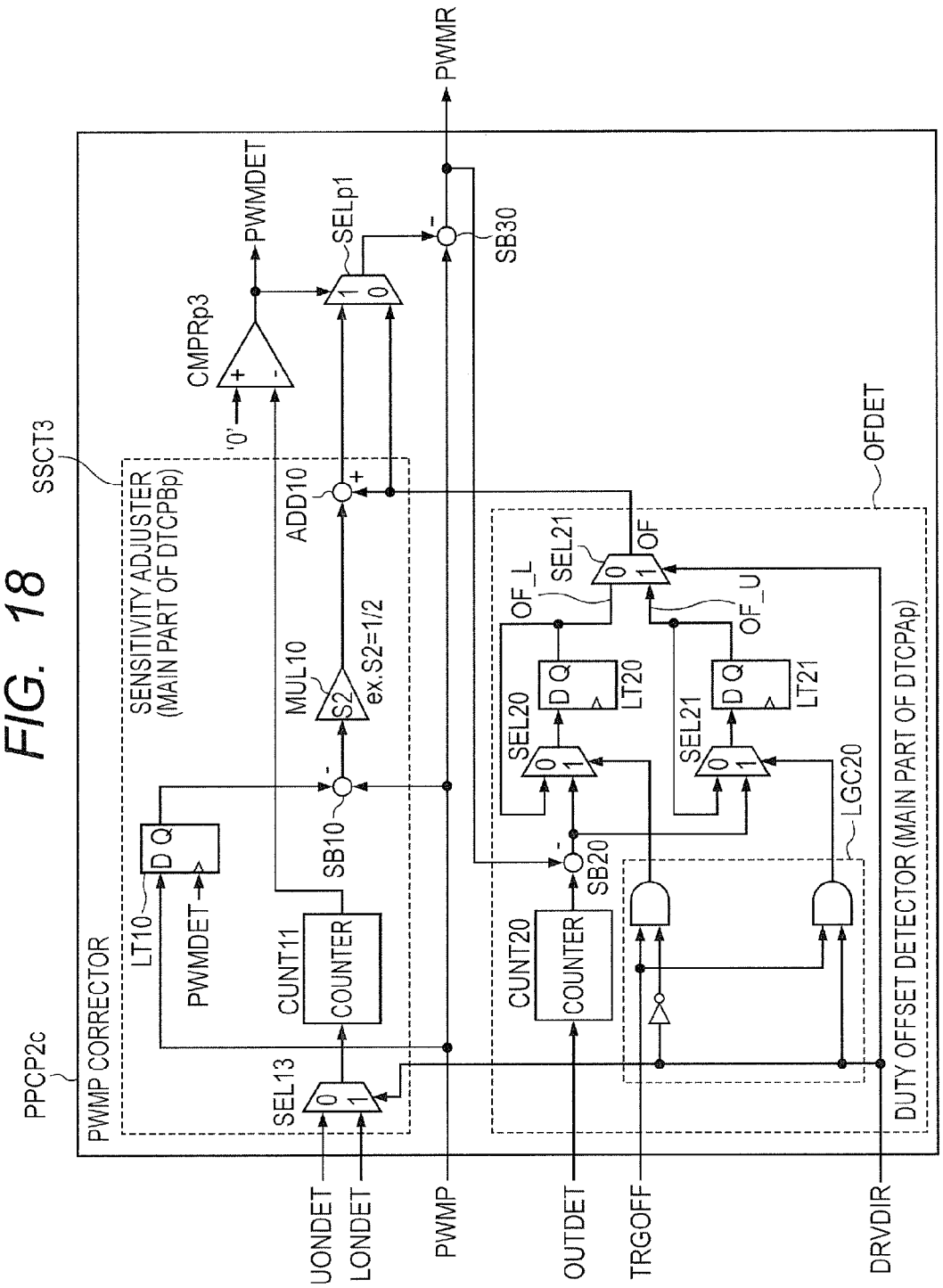
FIG. 18 is a circuit block diagram illustrating a detailed configuration example of the PWMP corrector in a motor driving device according to a third embodiment of the present invention.
Figure 19:
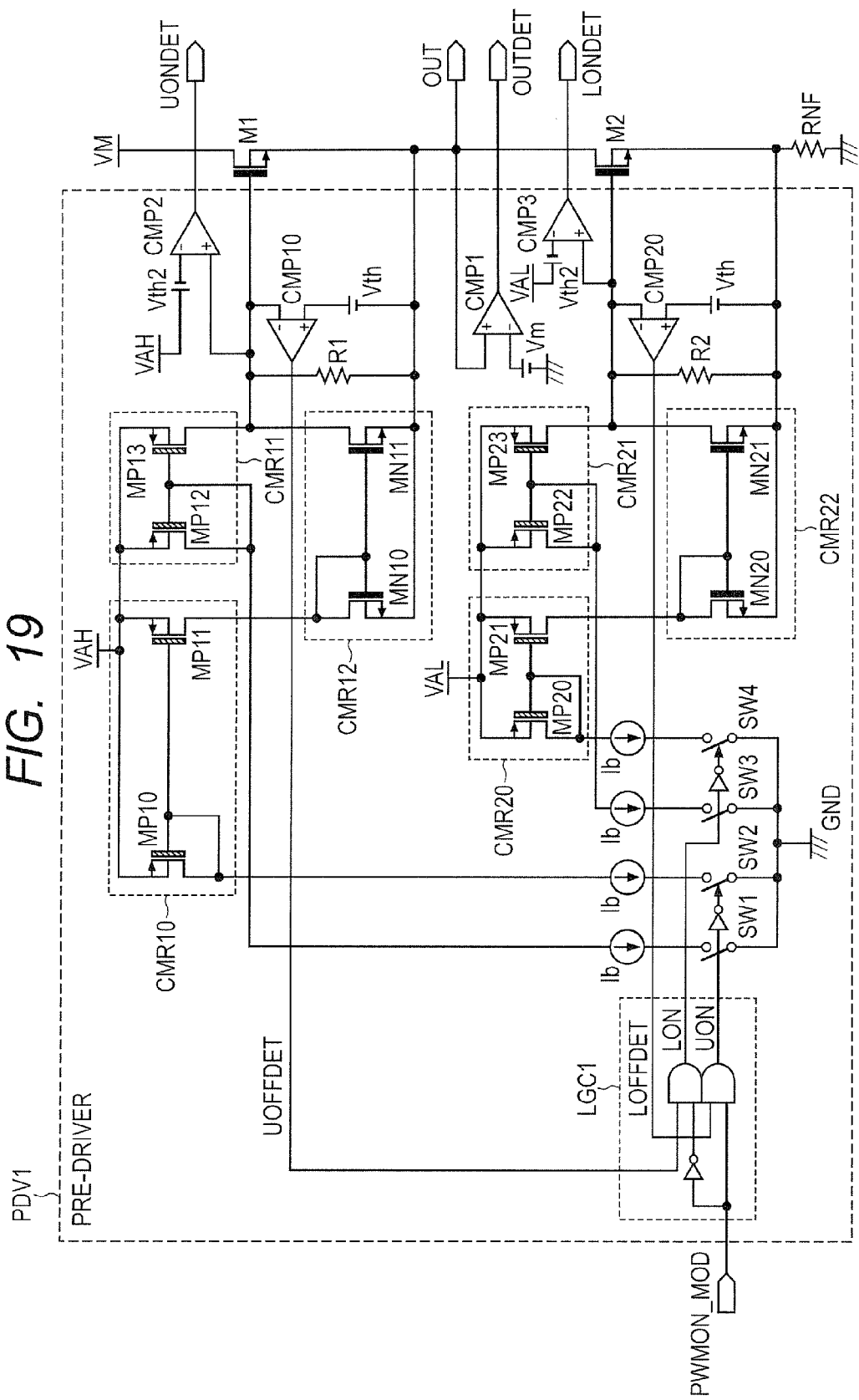
FIG. 19 is a circuit diagram illustrating a detailed configuration example of a pre-driver in the motor driving device according to the third embodiment of the present invention.

FIG. 18 is a circuit block diagram illustrating a detailed configuration example of a PWMP corrector in a motor driving device according to a third embodiment of the present invention. FIG. 19 is a circuit diagram illustrating a detailed configuration example of a pre-driver in the motor driving device according to the third embodiment of the present invention. A pre-driver PDV1 illustrated in FIG. 19 is different from the pre-driver PDV illustrated in FIG. 8 with respect to the point that the comparator circuits CMP2 and CMP3 are added.

The comparator circuit CMP2 compares gate voltage of the high-side transistor M1 with "VAH−Vth2" and, in the case where the gate voltage reaches the power supply voltage VAH, asserts the high-side full-on detection signal UONDET to the "H" level. The threshold voltage Vth2 is determined to a small voltage value necessary to determine whether the gate voltage reaches the power supply voltage VAH or not in consideration of an offset of the comparator circuit CMP2 and the like. Similarly, the comparator circuit CMP3 compares gate voltage of the low-side transistor M2 with "VAH−Vth2" and, in the case where the gate voltage reaches the power supply voltage VAH, asserts the low-side full-on detection signal LONDET to the "H" level.

The PWMP corrector PPCP2c illustrated in FIG. 18 is similar to the PWMP corrector PPCP2b of FIG. 17 except the point that the configuration of the sensitivity adjuster SSCT3 is different and the point that the input of the comparator CMPRp3 is different. The sensitivity adjuster SSCT3 in FIG. 18 has, in addition to the subtracter SB10, the multiplier MUL10, the adder ADD10, and the latch circuit LT10 illustrated in FIG. 17, a selector SEL13 and a counter CUNT11.

The PWMP corrector PPCP2c illustrated in FIG. 18 has conceptually a configuration that, in a manner similar to the case of FIG. 17, the duty reference value KREV in the PWMP corrector PPCP2 illustrated in FIG. 14A is determined on the basis of an actual measurement result. Outline is described as follows. The duty reference value KREV is determined by monitoring the voltage applied at the time of controlling the regenerative transistor to be on and is determined to the duty instruction value PWMP at the time point when the voltage does not reach a predetermined voltage.

Concretely, first, the selector SEL13 outputs a low-side full-on detection signal LONDET illustrated in FIG. 19 when the drive direction instruction signal DRVDIR is at the "H" level (current source), and outputs a high-side full-on signal UONDET when the drive direction instruction signal DRVDIR is at the "L" level (current sink). The counter CUNT11 counts the "H" period (assert period) of the signal output from the selector SEL13 by reference clocks of digital control.

When the count value from the counter CUNT11 becomes zero, the comparator CMPRp3 makes the detection signal PWMDET shift from the "L" level to the "H" level. The latch circuit LT10 latches the duty instruction value PWMP using the transition of the detection signal PWMDET to "H" as a trigger and outputs the duty reference value KREV. The duty reference value KREV is determined as a value (first duty reference value) based on a result of determination of the low-side full-on detection signal LONDET at the time of current source and determined as a value (second duty reference value) based on a result of determination of the high-side full-on detection signal UONDET at the time of current sink.

As understood from FIG. 13, necessity of switching between the first duty correction circuit [1] DTCPAp and the second duty correction circuit [1] DTCPBp can be determined by whether the gate voltage of the regenerative transistor can reach the maximum voltage level or not. In the case where the regenerative transistor reaches the maximum voltage level, the assert period of the low-side full-on detection signal LONDET is generated at the time of current source and the assert period of the high-side full-on detection signal UONDET is generated at the time of current sink.

The comparator CMPRp3 monitors the presence/absence of the assert period in each of the full-on detection signals (LONDET and UONDET) and holds the duty instruction value PWMP at the time point when there is no assert period as the duty reference value KREV in the latch circuit LT10. For example, when the case that the duty instruction value PWMP increases is assumed, at some time point, the assert period of the full-on detection signal does not exist, and the duty instruction value PWMP at that time point is held as the duty reference value KREV in the latch circuit LT10.

The comparator CMPRp3 makes the selector SELp1 select the second duty correction circuit DTCPBp side at the same timing as the timing when the duty reference value KREV is held. With further increase in the duty instruction value PWMP, as long as the assert period of the full-on detection signal is not generated, the comparator CMPRp3 makes the selector SELp1 select the second duty correction circuit DTCPBp side. In this state, in other words, in the case where PWMP>KREV, the selector SELp1 selects the second duty correction circuit DTCPBp side.

On the other hand, for example, when the duty instruction value PWMP becomes in the decrease direction and the assert period of the full-on detection signal is generated, the comparator CMPRp3 makes the selector SELp1 select the first duty correction circuit DTCPAp side. The duty instruction value PWMP at the time point when the assert period of the full-on detection signal is generated becomes equal to the duty reference value KREV held in the latch circuit LT10. Therefore, in the state, in other words, when PWMP-KREV, the selector SELp1 selects the first duty correction circuit DTCPAp side.

By using the method of the third embodiment, in a manner similar to the case of the second embodiment, in some cases, noise and vibration of the motor can be further reduced as compared with the method of the first embodiment. Specifically, in the method of the third embodiment, the duty reference value KREV is a variable which is determined by actually measuring whether the gate voltage of the regenerative transistor reaches the maximum voltage level or not. Consequently, there is a case that correction precision can be improved as compared with that in the method of the first embodiment.

Further, since a measurement result which is more direct than that in the method of the second embodiment is used, there is a case that correction precision can be further improved as compared with that in the method of the second embodiment. Specifically, as described with reference to FIG. 13, the limit point of the first duty correction circuit DTCPAp is directly determined by the presence/absence of reach to the maximum voltage level of the regenerative transistor and, as an indirect element, depends on the on period of the regenerative transistor. On the other hand, from the viewpoint of the circuit area, the method of the second embodiment is more advantageous since the comparator circuits CMP2 and CMP3 are unnecessary.

Although the present invention achieved by the inventors herein have been concretely described on the basis of the embodiments, the present invention is not limited to the foregoing embodiments but can be variously changed without departing from the gist. For example, the foregoing embodiments are specifically described to make the present invention easily understood, and the present invention is not always limited to an embodiment having all of the above-described configurations. A part of the configuration of an embodiment can be replaced by the configuration of another embodiment, and the configuration of an embodiment can be added to the configuration of another embodiment. With respect to a part of the configuration of each of the embodiments, addition of another configuration, deletion, and replacement can be performed.

For example, the methods of the embodiments are not limited to the HDD device but can be applied as a method of driving various motors including a DVD reproducing/recording device and a Blu-ray reproducing/recording device. Particularly, it is advantageous to apply the invention to a use of high PWM frequency. That is, the higher the PWM frequency becomes, an error of duties may become larger relatively. Therefore, a more beneficial effect is obtained. In the HDD device, the PWM frequency is, for example, about 100 k [Hz].

As motor driving methods, in addition to the sine wave driving method as described above, a rectangular wave driving method also exists. In successive PWM cycles, in the rectangular wave driving method, usually, the duty becomes constant. In the sine wave driving method, the duty is variably controlled. By the sine wave driving method, usually, higher efficiency, lower vibration, and lower noise of a motor as compared with the rectangular wave driving method can be realized. Therefore, although the method of the embodiment can be also applied to the rectangular wave driving method, it is more beneficial to apply it to the sine wave driving method.

What is claimed is:

1. A motor driving method of driving a motor by using a motor driving device,
   wherein the motor driving device comprises:
   a drive transistor passing drive current to the motor when it is controlled to be on; and
   a regenerative transistor configuring a half bridge circuit in cooperation with the drive transistor and, when controlled to be on, passing regenerating current from the motor,
   wherein the motor driving device executes:
   a duty instructing operation of outputting a duty instruction value expressing ratio of an on period in a PWM cycle;
   a duty correcting operation of correcting the duty instruction value and outputting, as a corrected duty instruction value, any one of a first corrected duty instruction value and a second corrected duty instruction value in accordance with a magnitude relation between the duty instruction value and a duty reference value;
   a PWM signal generating operation of generating a PWM signal based on the corrected duty instruction value; and
   a drive operation of controlling the drive transistor to be on in the on period in the PWM signal, controlling the regenerative transistor to be on in an off period in the PWM signal, controlling the regenerative transistor from on to off in response to transition from the off period in the PWM signal to the on period, and controlling the drive transistor from off to on after off of the regenerative transistor is detected,
   wherein the first corrected duty instruction value is a value which changes with an increment same as an increment of the duty instruction value and in which an offset value as a constant is reflected, and
   wherein the second corrected duty instruction value is a value which changes with an increment different from an increment of the duty instruction value.

2. The motor driving method according to claim 1, wherein in the duty correcting operation, when the duty instruction value is smaller than the duty reference value, the first corrected duty instruction value is output, when the duty instruction value is larger than the duty reference value, the second corrected duty instruction value is output, and
   wherein the second corrected duty instruction value changes with an increment smaller than an increment of the duty instruction value.

3. The motor driving method according to claim 2, wherein the first corrected duty instruction value is generated by adding/subtracting the offset value to/from the duty instruction value, and
   wherein the second corrected duty instruction value is generated by an arithmetic operation using the offset value and a value of "(PWMP−KREV)×S" where "PWMP" denotes the duty instruction value, "KREV" denotes the duty reference value, and "S" (0<S<1) denotes a sensitivity coefficient.

4. The motor driving method according to claim 1, wherein the duty reference value is determined to an arbitrary value by a setting.

5. The motor driving method according to claim 1, wherein the duty reference value is determined by monitoring an on period of the regenerative transistor and determined to the duty instruction value at the time point when the on period becomes shorter than a predetermined period.

6. The motor driving method according to claim 1, wherein the duty reference value is determined by monitoring a voltage which is applied at the time of controlling the regenerative transistor to be on and determined to the duty instruction value at the time point when the voltage does not reach a predetermined voltage.

7. The motor driving method according to claim 1, wherein in the duty instructing operation, the duty instruction value for each PWM cycle to control drive current of the motor to a sine wave shape is output.

8. The motor driving method according to claim 1, wherein the motor driving device has:
   a high-side transistor to which power supply voltage is supplied; and
   a low-side transistor to which grounding power supply voltage is supplied,
   wherein in a first PWM cycle, the high-side transistor and the low-side transistor become the drive transistor and the regenerative transistor, respectively,
   wherein in a second PWM cycle, the high-side transistor and the low-side transistor become the regenerative transistor and the drive transistor, respectively, and
   wherein the duty reference value is configured by a first duty reference value used in the first PWM cycle and a second duty reference value used in the second PWM cycle.

9. A motor driving device driving a motor provided on the outside, comprising:
   a drive transistor passing drive current to the motor when it is controlled to be on;
   a regenerative transistor configuring a half bridge circuit in cooperation with the drive transistor and, when controlled to be on, passing regenerating current from the motor;
   a duty instructing unit outputting a duty instruction value expressing ratio of an on period in a PWM cycle;
   a duty correcting unit correcting the duty instruction value and outputting a corrected duty instruction value;
   a PWM signal generating unit generating a PWM signal based on the corrected duty instruction value; and a driver unit controlling the drive transistor to be on in the on period in the PWM signal and controlling the regenerative transistor to be on in an off period in the PWM signal, wherein the driver unit controls the regenerative transistor from on to off in response to transition from the off period in the PWM signal to the on period, and controls the drive transistor from off to on after off of the regenerative transistor is detected, and wherein the duty correcting unit comprises:

a first duty correction circuit generating a first corrected duty instruction value which changes with an increment same as an increment of the duty instruction value and in which an offset value as a constant is reflected;

a second duty correction circuit generating a second corrected duty instruction value which changes with an increment different from an increment of the duty instruction value; and a selecting unit outputting, as the corrected duty instruction value, either one of the first corrected duty instruction value and the second corrected duty instruction value in accordance with a magnitude relation between the duty instruction value and a duty reference value.

10. The motor driving device according to claim 9, wherein the selecting unit outputs the first corrected duty instruction value when the duty instruction value is smaller than the duty reference value and outputs the second corrected duty instruction value when the duty instruction value is larger than the duty reference value, and wherein the second corrected duty instruction value changes with an increment smaller than an increment of the duty instruction value.

11. The motor driving device according to claim 10, wherein the first duty correction circuit generates the first corrected duty instruction value by adding/subtracting the offset value to/from the duty instruction value, and wherein the second duty correction circuit generates the second corrected duty instruction value by an arithmetic operation using the offset value and a value of "(PWMP−KREV)×S" where "PWMP" denotes the duty instruction value, "KREV" denotes the duty reference value, and "S" (0<S<1) denotes a sensitivity coefficient.

12. The motor driving device according to claim 9, wherein the duty reference value is determined to an arbitrary value by a setting.

13. The motor driving device according to claim 9, wherein the duty reference value is determined by monitoring an on period of the regenerative transistor and determined to the duty instruction value at the time point when the on period becomes shorter than a predetermined period.

14. The motor driving device according to claim 9, wherein the duty reference value is determined by monitoring a voltage which is applied at the time of controlling the regenerative transistor to be on and determined to the duty instruction value at the time point when the voltage does not reach a predetermined voltage.

15. The motor driving device according to claim 9, wherein the duty instructing unit outputs the duty instruction value for each PWM cycle to control drive current of the motor to be in a sine wave shape.

16. The motor driving device according to claim 9, wherein the motor driving device has:

a high-side transistor to which power supply voltage is supplied; and a low-side transistor to which grounding power supply voltage is supplied, wherein in a first PWM cycle, the high-side transistor and the low-side transistor become the drive transistor and the regenerative transistor, respectively, wherein in a second PWM cycle, the high-side transistor and the low-side transistor become the regenerative transistor and the drive transistor, respectively, and wherein the duty reference value is configured by a first duty reference value used in the first PWM cycle and a second duty reference value used in the second PWM cycle.

17. A hard disk device comprising:

a magnetic disk storing data;

a motor rotating the magnetic disk; and a motor driving device driving the motor with a sine wave of three phases, wherein the motor driving device comprises:

a drive transistor passing drive current to the motor when it is controlled to be on;

a regenerative transistor configuring a half bridge circuit in cooperation with the drive transistor and, when controlled to be on, passing regenerating current from the motor;

a duty instructing unit outputting a duty instruction value expressing ratio of an on period in a PWM cycle;

a duty correcting unit correcting the duty instruction value and outputting a corrected duty instruction value;

a PWM signal generating unit generating a PWM signal based on the corrected duty instruction value; and a driver unit controlling the drive transistor to be on in the on period in the PWM signal and controlling the regenerative transistor to be on in an off period in the PWM signal, wherein the driver unit controls the regenerative transistor from on to off in response to transition from the off period in the PWM signal to the on period, and controls the drive transistor from off to on after off of the regenerative transistor is detected, and wherein the duty correcting unit comprises:

a first duty correction circuit generating a first corrected duty instruction value which changes with an increment same as an increment of the duty instruction value and in which an offset value as a constant is reflected;

a second duty correction circuit generating a second corrected duty instruction value which changes with an increment different from an increment of the duty instruction value; and a selecting unit outputting, as the corrected duty instruction value, either one of the first corrected duty instruction value and the second corrected duty instruction value in accordance with a magnitude relation between the duty instruction value and a duty reference value.

18. The hard disk device according to claim 17, wherein the selecting unit outputs the first corrected duty instruction value when the duty instruction value is smaller than the duty reference value and outputs the second corrected duty instruction value when the duty instruction value is larger than the duty reference value, and wherein the second corrected duty instruction value changes with an increment smaller than an increment of the duty instruction value.

19. The hard disk device according to claim 18, wherein the first duty correction circuit generates the first corrected duty instruction value by adding/subtracting the offset value to/from the duty instruction value, and wherein the second duty correction circuit generates the second corrected duty instruction value by an arithmetic operation using the offset value and a value of "(PWMP−KREV)×S" where "PWMP" denotes the duty instruction value, "KREV" denotes the duty reference value, and "S" (0<S<1) denotes a sensitivity coefficient.

20. The hard disk device according to claim 17, wherein the motor driving device has:

a high-side transistor to which power supply voltage is supplied; and a low-side transistor to which grounding power supply voltage is supplied, wherein in a first PWM cycle, the high-side transistor and the low-side transistor become the drive transistor and the regenerative transistor, respectively, wherein in a second PWM cycle, the high-side transistor and the low-side transistor become the regenerative transistor and the drive transistor, respectively, and wherein the duty reference value is configured by a first duty reference value used in the first PWM cycle and a second duty reference value used in the second PWM cycle.

* * * * *